United States Patent
Faulhaber, Jr. et al.

(10) Patent No.: US 11,257,002 B2
(45) Date of Patent: Feb. 22, 2022

(54) DYNAMIC ACCURACY-BASED DEPLOYMENT AND MONITORING OF MACHINE LEARNING MODELS IN PROVIDER NETWORKS

(71) Applicant: Amazon Technologies, Inc., Seattle, WA (US)

(72) Inventors: Thomas Albert Faulhaber, Jr., Seattle, WA (US); Edo Liberty, New York, NY (US); Stefano Stefani, Issaquah, WA (US); Zohar Karnin, Hoboken, NJ (US); Craig Wiley, Redmond, WA (US); Steven Andrew Loeppky, Seattle, WA (US); Swaminathan Sivasubramanian, Sammamish, WA (US); Alexander Johannes Smola, Sunnyvale, CA (US); Taylor Goodhart, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 879 days.

(21) Appl. No.: 15/919,628

(22) Filed: Mar. 13, 2018

(65) Prior Publication Data
US 2019/0156247 A1    May 23, 2019

Related U.S. Application Data

(60) Provisional application No. 62/590,161, filed on Nov. 22, 2017.

(51) Int. Cl.
*G06F 16/90* (2019.01)
*G06F 16/95* (2019.01)
(Continued)

(52) U.S. Cl.
CPC .......... *G06N 20/00* (2019.01); *G06N 3/0454* (2013.01); *G06N 3/08* (2013.01); *G06N 5/04* (2013.01)

(58) Field of Classification Search
CPC ........ G06N 20/00; G06N 3/0454; G06N 3/08; G06N 5/04
(Continued)

(56) References Cited

U.S. PATENT DOCUMENTS 8,938,463 B1 * 1/2015 Kim .................... G06F 16/9535
707/751
9,542,591 B2 * 1/2017 Moussavi ............ G06K 9/6277
(Continued)

OTHER PUBLICATIONS

Communication pursuant to Article 94(3) EPC, EP App. No. 18836552.2, dated Sep. 25, 2020, 7 pages.
(Continued)

*Primary Examiner* — Brandon S Cole
(74) *Attorney, Agent, or Firm* — Nicholson De Vos Webster & Elliott, LLP

(57) ABSTRACT

Techniques for dynamic accuracy-based experimentation and deployment of machine learning (ML) models are described. Inference traffic flowing to ML models and the accuracy of the models is analyzed and used to ensure that better performing models are executed more often via model selection. A predictive component can evaluate which model is more likely to be accurate for certain input data elements. Ensemble techniques can combine inference results of multiple ML models to aim to achieve a better overall result than any individual model could on its own.

20 Claims, 11 Drawing Sheets

(51) Int. Cl.
  *G06F 21/57* (2013.01)
  *G10L 15/07* (2013.01)
  *G06N 20/00* (2019.01)
  *G06N 5/04* (2006.01)
  *G06N 3/04* (2006.01)
  *G06N 3/08* (2006.01)

(58) Field of Classification Search
  USPC .......................................................... 706/1–62
  See application file for complete search history.

(56) References Cited

U.S. PATENT DOCUMENTS

| | | | |
|---|---|---|---|
| 10,255,907 B2* | 4/2019 | Nallasamy | G10L 15/16 |
| 10,558,924 B2* | 2/2020 | Achin | G06Q 10/06 |
| 10,904,360 B1* | 1/2021 | Govan | G06F 9/541 |
| 11,140,199 B2* | 10/2021 | Irimie | H04L 67/22 |
| 2015/0332169 A1* | 11/2015 | Bivens | G06N 20/00 |
| | | | 706/12 |
| 2017/0330078 A1 | 11/2017 | Koduru | |

OTHER PUBLICATIONS

International Preliminary Report on Patentability, PCT App. No. PCT/US2018/061522, dated Jun. 4, 2020, 9 pages.

International Search Report and Written Opinion received for related International Application No. PCT/US2018/061522, dated Mar. 25, 2019, 12 pages.

* cited by examiner

DYNAMIC ACCURACY-BASED DEPLOYMENT AND MONITORING OF MACHINE LEARNING MODELS IN PROVIDER NETWORKS

CROSS-REFERENCE TO RELATED APPLICATIONS

This application claims the benefit of U.S. Provisional Application No. 62/590,161, filed Nov. 22, 2017, which is hereby incorporated by reference.

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Figure 1:
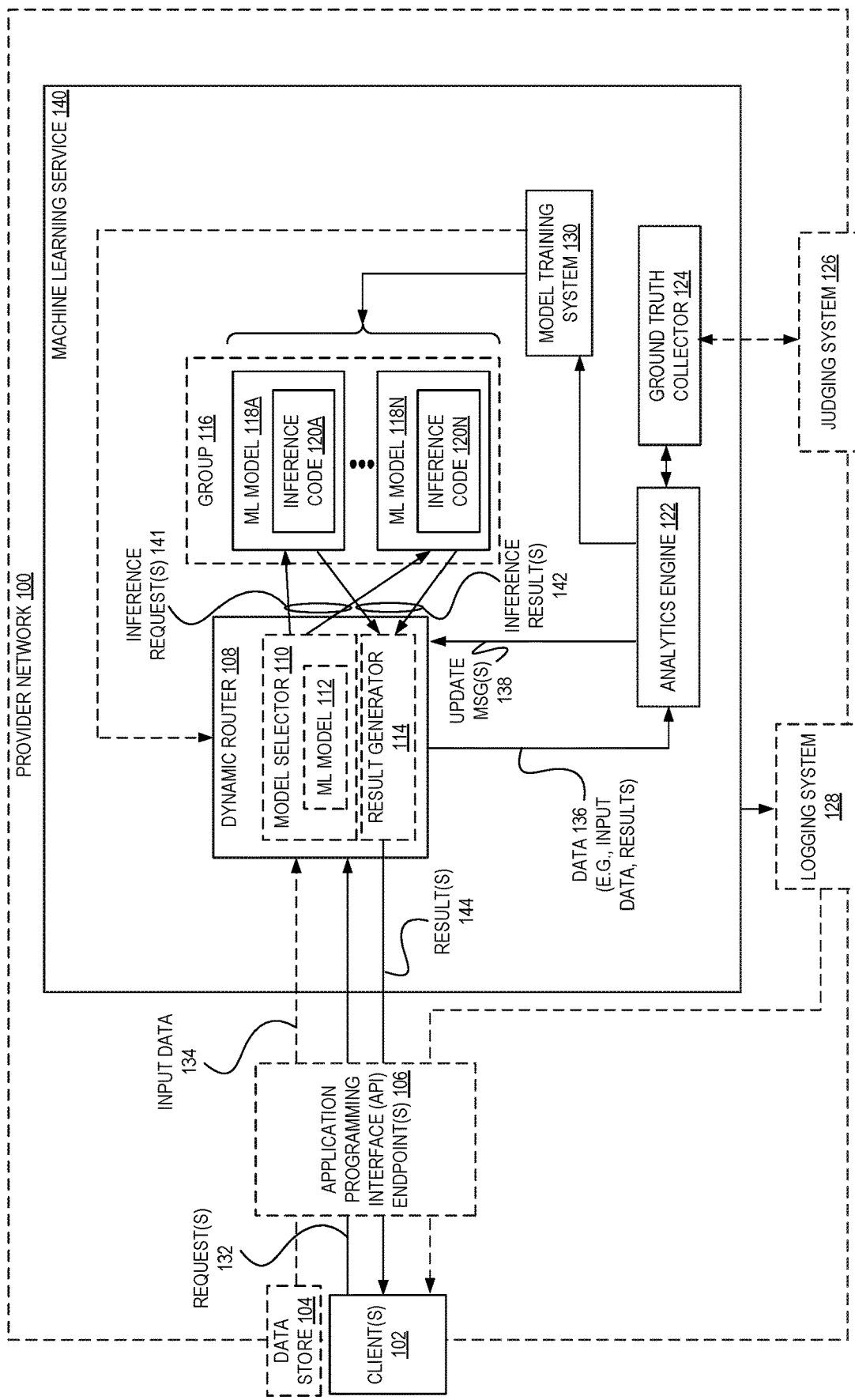
FIG. 1 is a diagram illustrating an environment for dynamic accuracy-based experimentation and deployment of machine learning models in provider networks according to some embodiments.

Various embodiments of methods, apparatus, systems, and non-transitory computer-readable storage media for dynamic accuracy-based experimentation and deployment of machine learning models are described. According to some embodiments, the performance of machine learning (ML) models can be dynamically evaluated on behalf of a user, and the resulting performance data can be used to improve the inference capabilities for the user.

For example, in some embodiments one or more primary ML models can be used to actively service inference requests while one or more secondary ML models can similarly—but without direct visibility for users or influence over the results provided to users—perform inference using the same input data, allowing the secondary ML model(s) to be evaluated for actual performance under the same conditions and environment as the "live" primary ML model(s).

As another example, in some embodiments the quality of multiple ML models can be measured and further traffic (e.g., inference requests) can be redirected in a controlled manner to cause more traffic to be processed by those ML models that are performing better, and thus traffic can be redirected away from those ML models that are not performing well. Such redirections can flexibly be configured to happen quickly or slowly, depending on the needs of the particular environment and/or the characteristics of the performance changes.

As yet another example, in some embodiments the quality of multiple ML models can be measured and used to generate yet another ML model that can predict, for a particular inference input data element, which one or more of multiple ML models will likely perform best (e.g., based on characteristics of the input data). This ML model can be used as part of a model selector that can dynamically route inference requests to particular ML models of a group of models that will likely yield a best result in terms of actual performance.

Further, as another example, some embodiments can implement an ensemble approach in which each of multiple ML models performs an inference for a particular inference request, and the multiple inference results generated by these models can be utilized to determine a single "best" response for the inference request, such as through techniques utilizing averaging, voting, etc.

As another example, some embodiments can accurately evaluate the "true" accuracy of various ML models in a group (e.g., that perform a same "type" of inference) despite these models possibly not servicing much live traffic. A ML model can thus have a true accuracy determined that reflects how the ML model would have performed had it serviced all requests over a particular amount of time despite, e.g., only servicing a small fraction of those requests, not servicing a representative portion of those requests, etc. As a result, ML models that may be underutilized but should be used more significantly can be identified and, optionally, automatically used more through changing how inference requests are distributed/routed to the ML models in the group.

As described above, it can be useful to have several different ML models serving a same purpose. For example, different ML models can be constructed using different training data, preprocessing operations, training parameters, model objectives, post-processing operations, or anything else that affects a final model. However, deciding which model from multiple models is "better" (and therefore should be used) is not a straightforward task. In many cases, a consistently "best" model may not exist, and a best model may depend on dynamic factors, such as spiky traffic and/or data distribution drifts. Moreover, certain models may perform better or worse based on the time of day (or day of week, week of year, month of year, etc.), the amount of overall traffic, or other transient circumstances. Further, in some cases it may be the case that some combination of models can perform even better than any single one alone.

For example, it may be commonplace in some environments for bias of ML models to change over time. Particular models may be trained with a corpus of data, but then when the world changes, the models may no longer be useful. For example, a language analyzer may be trained using a set of news writings, but then someday the world may change and completely different news stories are written about new events, people, companies, etc. In this case, the existing models may stop working well, and thus quality monitoring—or, watching bias—can be used to determine whether the models are we suddenly performing atypically poorly. This information can be used as "feedback" into model selection, allowing for different models to be selected at different times based on recent performance data.

Further, the configuration of deployed models affects which data is collected and thereby influences future model training. This intricate interaction can potentially cause bias and poor convergence of the models, and is hard to control and account for in general. As a consequence, measuring the effectiveness of ML models and deploying them successfully is a tremendously complex task which most ML practitioners either do very poorly or don't do at all.

Embodiments disclosed herein can address these and other issues using one or more of several components. For example, FIG. 1 is a block diagram illustrating an environment for dynamic accuracy-based experimentation and deployment of machine learning models in provider networks according to some embodiments. The environment may include a machine learning service 140 that provides clients 102 ML-related services, which may be provided using requests and responses (e.g., via one or more application programming interface (API) endpoints 106) as part of a web service, which thus may utilize HyperText Transfer Protocol (HTTP) messages or the like for communication.

In some embodiments, the machine learning service 140 is part of a provider network 100. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), machine learning services (e.g., training and/or deployment of models for inference), etc. These and other computing resources may be provided as services, such as a hardware virtualization service that can execute compute instances, a storage virtualization service that can store data objects, etc. The users (or "customers") of provider networks 100 may utilize one or more user accounts that are associated with a customer account, though these terms may be used somewhat interchangeably depending upon the context of use. Users (via software and/or hardware clients 102) may interact with a provider network 100 across one or more intermediate networks (e.g., the internet) via one or more interface(s), such as through use of application programming interface (API) calls to one or more API endpoints 106, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In some embodiments where a machine learning service 140 is part of a provider network 100, the provider network 100 may or may not include the data store 104, client(s) 102, a logging system 128, and/or judging system 126 (as shown by the representation of these entities as being on the border of an optional provider network 100). Further detail regarding provider networks, virtualization, and other related technologies will be presented later herein with regard to FIGS. 8-12.

In some embodiments, a machine learning service 140 can host one or more ML models 118A-118N (e.g., executing as inference code 120A-120N) by implementing the necessary architecture needed to support these models. Many different types of ML models (or combinations of models working together as a processing pipeline) may be hosted and/or trained. As one of nearly limitless possibilities, a model could be a language translation model that translates text (or speech) of one language into text (or speech) of another language, identifies a mood associated with the text/speech, etc. Such a model could be used, for example, to allow a user to type or otherwise input a message (e.g., using a customer device such as a smartphone, here represented as a client 102) that can be sent to the machine learning service 140 within (or identified by) a request 132, where the ML model can translate the input data 134 (from within the request, or another network-accessible location such as data store 104 that may be within or external to a provider network 100) that is a representation of text/speech to another language and send back a translation as a result 144. Further, a "model" may be used to refer to multiple models and/or components used together as part of a pipeline that can service requests—e.g., models or components used for data pre-processing, feature extraction, model fitting, validation, etc., such as generating language embeddings by transforming text into a vector space.

In some cases, multiple ML models 118A-118N can be configured as part of a group 116 of models—e.g., multiple models trained to perform a same "type" of inference (e.g., identifying objects depicted in images) using a same type of input data (e.g., images), but perhaps utilizing different algorithms, training configurations, training data, etc. In some embodiments, only one ML model of the group 116 may execute (or "run") using the input data 134 as input to thus generate an inference; however, in some embodiments, multiple ones (or even all) of the ML models of the group 116 may generate inferences for a particular inference request 132.

The machine learning service 140, which may execute the group 116 of ML models 118A-118N (e.g., within a model hosting system), in some embodiments includes a dynamic router 108 and an analytics engine 122. The dynamic router 108 and/or analytics engine 122 in some embodiments are implemented using software (e.g., as code executing within a container or VM), but in other embodiments these components may be implemented using hardware alone or a combination of hardware and software. The machine learning service 140 may also include a ground truth collector 124 and/or model training system 130 as described herein.

The dynamic router 108 includes a model selector 110 component that, for a received request 132, selects which one or ones of the group 116 of ML models 118A-118N to provide the request 132 (and/or input data 134) to (as part of inference request(s) 141), in order to cause the recipient model(s) to generate an inference result. The model selector 110 may include code that selects a model or models, e.g., a script including various logical tests. However, in some embodiments, the model selector 110 includes a ML model 112 (or multiple models) of its own that was trained to, using characteristics of the inference request and/or other environmental data, generate inference results identifying one or more models to process the inference request(s) 141 and as a result generate inference results 142. The model selector 110 can be implemented using hardware, software, or a combination of both.

In some embodiments, the dynamic router 108 includes a result generator 114. The result generator 114 can access interference results 142 generated by the selected models (e.g., by being sent these results from the model(s), by accessing a memory/storage location accessible to the model(s), etc.) and determine what results 144—if any—are to be provided to the requesting client 102. The result generator 114 can, for example, select one of multiple inference results 142 that are to be used as the definitive results and send those inference results 142 (e.g., from a first ML model) as results 144 to a client 102. However, in some embodiments, the result generator 114 may use an ensemble technique to arrive at a result 144, which may be based on some or all of the inference results 142 it obtains for particular inference requests 141. As a simple example, the result generator 114 may identify a most popular (i.e., most frequently occurring) result within the set of inference requests. Thus, if five models predict that a "dog" exists within an input image, while one model predicts that a "cat" exists in the image, the result generator 114 may determine that "dog" is the proper result due to its relative popularity within the set (compared to "cat"). As another example, the result generator 114 may determine an average value (or mode, median, etc.) from the values within the set of inference requests—e.g., if four results are for the values 10, 25, 25, and 50, the result could be an average value of 27.5, a mode of 25, etc. The result generator 114 can be implemented using hardware, software, or a combination of both.

The dynamic router 108 may also provide data 136 to the analytics engine 122. The data 136 may include, for example, the input data 134 (e.g., provided in, or identified by, a request 132), the individual inference results 142 generated by the ML models 118, etc. The analytics engine 122 can determine, using such data 136, the quality of the inferences of the ML model(s) 118. For example, the analytics engine 122 can compare the different inference results 142 generated by the models, and/or determine the "ground truth" (e.g., what the proper inference should be, as determined by another judging system 126—e.g., via crowd-sourcing, or a knowledge database, etc.) and thus determine which inference results are "correct" or the closest to being correct. With such an analysis, the analytics engine 122 can perform any number of operations, including but not limited to updating (via an update message 138) how the model selector 110 selects ML models (e.g., to push more traffic to "better" performing models, to steer traffic away from worse performing models, etc.), updating (via an update message 138) how the result generator 114 generates results 144 (e.g., to assign more weight to inference result data coming from better performing models), updating a model training system 130 to cause particular models 118A-118N (or a predictive ML model 112) to be trained or re-trained, logging such analysis result data in a logging system 128, reporting analysis result data back to client(s) 102, etc.

Figure 2:
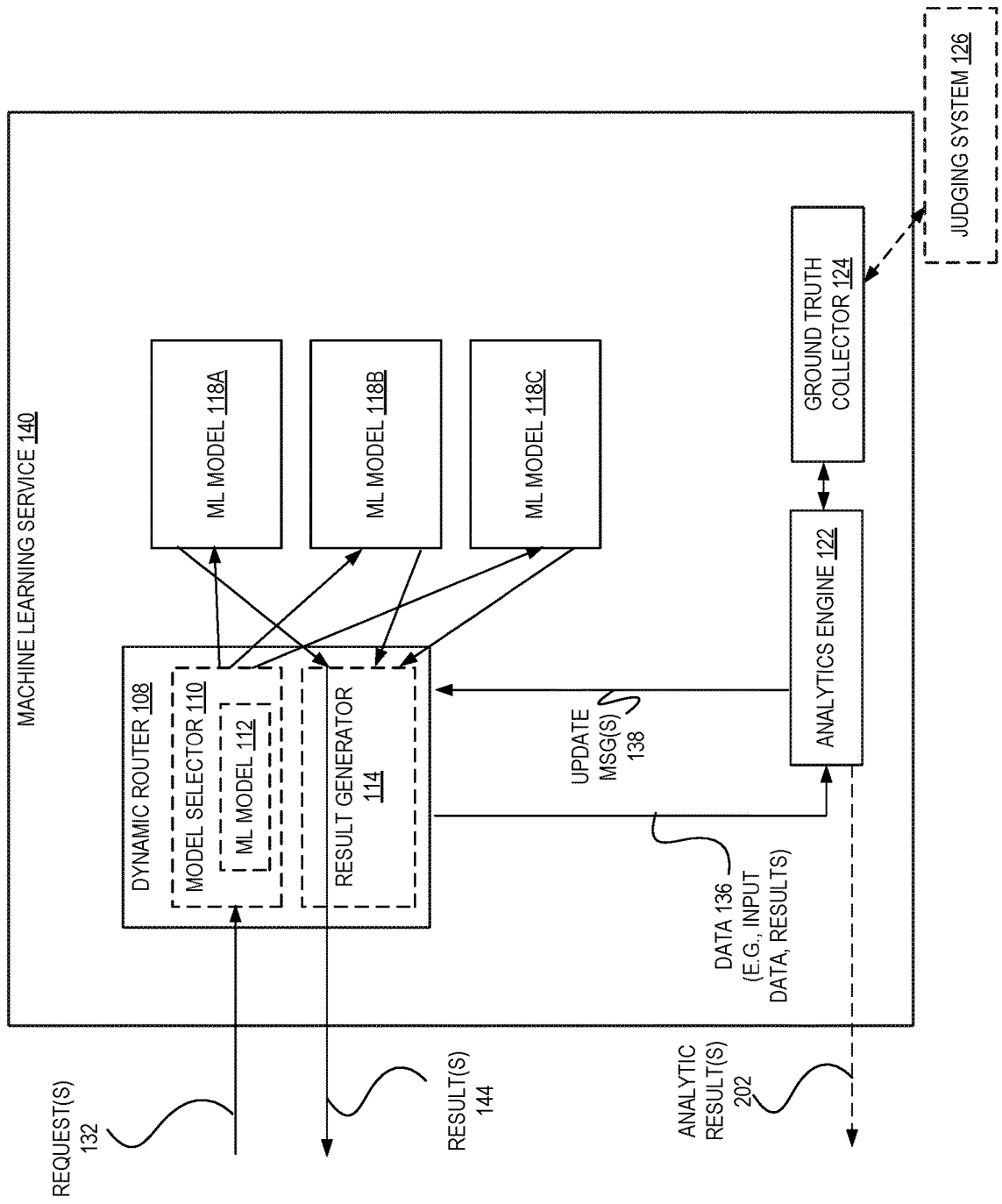
FIG. 2 is a diagram illustrating exemplary shadow running operations in an environment for dynamic accuracy-based experimentation and deployment of machine learning models according to some embodiments.

For further detail, FIG. 2 is a diagram illustrating exemplary shadow running operations in an environment for dynamic accuracy-based experimentation and deployment of machine learning models according to some embodiments. In some embodiments, the machine learning service 140 implements a shadow execution system that can "silently" evaluate the functionality of multiple ML models 118A-118C using legitimate request data that is actually serviced (e.g., in which results are returned) by one ML model 118A.

For example, a user may have a new model (e.g., an updated model, such as one trained using different hyper-parameter values) that they seek to deploy. Before the user makes this model the public or "live" model (which would give results back to clients), the dynamic router 108 can apply both an old model (or models) and the new model for incoming requests that are actually serviced by an old model. Accordingly, through use of "real" (i.e., non-simulated) request data under similar operational settings/characteristics as utilized by the existing model, the analytics engine 122 can measure how the "new" model would have performed if it had actually been set as the "live" model. For example, the analytics engine 122 can interact with a ground truth collector 124 to obtain ground truth for a set of requests, and compare this obtained ground truth with the inference results generated by the ML model(s) 118A-118C under scrutiny to identify the true accuracy of these models.

Depending upon the particular use case, the analytics engine 122 can act in a variety of ways after such determinations, including but not limited to sending an update message 138 to the dynamic router 108 to cause the model selector 110 to switch over some or all traffic to a "new" model (e.g., if its performance meets or exceeds some threshold, such as having an accuracy value that is greater than the "old" model's corresponding accuracy value), sending analytic results 202 to a logging system or client, etc.

The ML service 140, via such shadow execution techniques, can also provide benefits with more than two models in use. For example, if a client were to have twenty different models, the dynamic router 108 cause all of them to be executed for a request, and thus each of these twenty different models can operate upon the request using the same data and environment, allowing for a true apples-to-apples comparison of the performance and results of these models. The analytics engine 122 thus can, for example, watch the outputs of each model and/or measure the performance (e.g., required time to execute, resource utilization such as processing, memory, etc.) of each model. The results of these parallel "shadow" executions, on a per-request basis and/or in an aggregate form (e.g., across multiple requests grouped according to time, type, etc.) can be provided to the user to provide the useful information needed to select the best model or models for future jobs, or can be used (e.g., with a set of user-defined model transition rules) to update the model selector 110 to use different models.

As introduced above, judging the quality of results—i.e., whether they are correct—is traditionally a difficult task. Embodiments disclosed herein can judge the quality of results in a variety of ways. For example, in some embodiments the analytics engine 122 can compare the results from each of the multiple models to identify results that appear across the set with more frequently as being the most likely correct, as it is statistically likely that results that are generated across a large number of models are more likely to be correct than those that do not. In some embodiments, the analytics engine 122 can identify differences between the results, and send the results (and/or differences, or unique different results) through a judging system 126, which can be an automated system that is programmed with domain-specific knowledge or has access to correct answers (e.g., from previous results deemed acceptable), a crowd-sourcing platform, etc. Moreover, in some embodiments, the analytics engine 122 can determine whether a subsequent action of the client that issued a particular request is satisfied with the results—either explicitly (e.g., via a prompt to the user asking whether the results were good) or impliedly (e.g., by monitoring further requests or activity of the user, such as by determining whether a subsequent request from the user is received for a similar query, which would likely indicate the results were not good, etc.)

Figure 3:
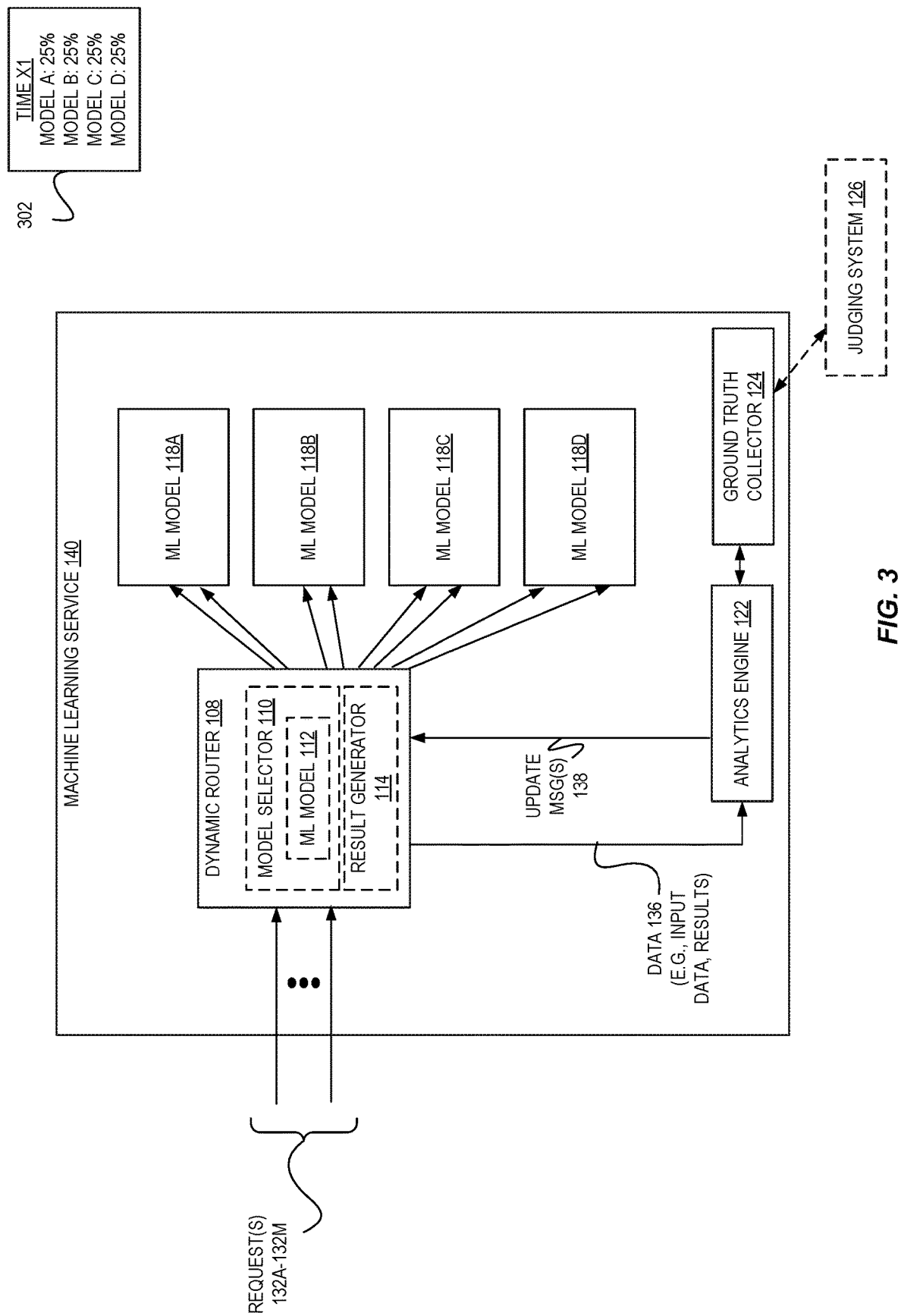
FIG. 3 is a diagram illustrating exemplary explore-and-exploit operations at a first point in time in an environment for dynamic accuracy-based experimentation and deployment of machine learning models according to some embodiments.

Additionally, FIG. 3 is a diagram illustrating exemplary explore-and-exploit operations at a first point in time in an environment for dynamic accuracy-based experimentation and deployment of machine learning models according to some embodiments. As illustrated, the machine learning service 140 can implement an "explore and exploit" system that can evaluate the functionality of multiple ML models using legitimate request data that is actually serviced (e.g., in which results are returned) by one model, and change the distribution of new requests/work to different models based on the performance of the models.

With traditional software engineering, it is typical to completely switch over to a new version of a piece of software at once. In fact, many systems exist to allow for complete and instantaneous rollovers to a new application. However, in machine learning, this approach is not preferred. For example, when a model is deployed, it is often unclear as to whether it is better or worse than an existing or previous model as the implementing party may not have the right data, it may be uncertain how users will react to the new model, or there may be some effect that may arise that can change user behavior. Accordingly, it is often preferable with ML models to launch new models very slowly to ensure that new models do, in fact, work well.

However, doing this correctly is extremely difficult. Some embodiments disclosed herein can automate the procedure in an extremely effective manner that cannot be achieved using existing and/or manual tuning. In some embodiments, instead of launching models in phases, the machine learning service 140 can automate a deployment by measuring some behavior (e.g., user satisfaction, quality of experience, etc.) that acts as a surrogate for indicating "success" via analytics engine 122. Using this measured behavior, the machine learning service 140 in some embodiments can blend the usage of certain models at the right speed to be confident that the transition is not making things worse. Further, if a new model is in fact superior to an old model, embodiments can automatically shift to completely utilize the new model in a relatively fast amount of time.

For further detail, a customer of a provider network may have a new model that they think is better than an existing model. If the customer performs a complete switch from the old to the new model, and if the new model is actually worse than the old one, then a huge downside is created in that all of the involved users are negatively impacted due to them all using an inferior model. So, one approach could be to slowly shift to using the new model very slowly (e.g., 1% chunks of traffic can be incrementally added to the new model periodically over a long amount of time such as weeks or months). However, this approach is also not effective because if the new model is actually worse than the old, then this approach slowly degrades the application over a long time, and thus it will steadily get worse and worse and worse.

Accordingly, embodiments can manage the speed of switching between models based on the measured quality differences between the models. In some embodiments, the analytics engine 122 can monitor the utility/satisfaction of the model's users, and can cause the model selector 110 to "blend" in the use of new models relatively quickly if they prove significantly better than another model, while not sacrificing on quality at same time.

In some embodiments, this explore and exploit technique can be performed dynamically. For example, one model may be better than another during certain times (e.g., holidays, days of week). Accordingly, analytics engine 122 in some embodiments continues to monitor (and test) many models—while models that do well are presented and used more heavily, models that may not be quite as effective may still be provided some requests so that if and when they start performing in a superior manner, the analytics engine 122 can notice the improved performance and start shifting more traffic back to this model.

In some embodiments, the machine learning service 140 implements these techniques by having multiple models serve real traffic, though in other embodiments the machine learning service 140 utilizes shadow running as described above with regard to FIG. 2—e.g., via allowing some models to be run "silently" in order to watch their performance.

In some embodiments, the rate at which a traffic shift is performed can be based on the performance of the models. In contrast to previous approaches where, for example, a customer may request that a particular amount of traffic (e.g., 3% of traffic) over an amount of time (e.g., two weeks) is shifted to a new model, in some embodiments the machine learning service 140 can have multiple models performing the same tasks (or the same "type" of inference), discover which model is performing better, start shifting over traffic to the more performant one(s), continue to monitor the performance of the models, and continue to adjust the shifting of traffic accordingly. Thus, a shift may occur in one direction (e.g., only from a first model A to a second model B) and/or in two directions (e.g., from model A towards model B, and then later from model B back towards model A).

The analytics engine 122 can evaluate which model is producing the best results using a similar technique or techniques as described with regard to the shadow execution techniques discussed above in FIG. 2—e.g., results comparisons, explicit or implied user feedback analysis, use of an external judging system, etc.

In some embodiments, the machine learning service 140 can support more than two models at a time for a particular task, and shift between the three or more models such that at any point in time, one, two, or all three (or more) of the models may be used to service traffic—potentially at different amounts.

In some embodiments, if the performance of a model is sufficiently poor such that it passes a threshold (e.g., set by the machine learning service 140 and/or configured by a customer), the model may be completely removed from servicing any traffic. However, in some embodiments the model may still be utilized, albeit possibly to a very small extent, to allow for potential increases in performance (e.g., such as due to a temporal factor) to be detected by the analytics engine 122.

Instead of moving from an existing model to one or more new models, the machine learning service 140 can also support the simultaneous deployment of multiple models. The machine learning service 140 can, for example, initially give every model a same amount of traffic, monitor the performance of the models, and then start shifting inference requests accordingly, which can be done in a precise manner using mathematical formulas to shift between them. For example, in FIG. 3, at a point in time "X1" (represented by box 302) the model selector 110 may route requests 132A-132M (as inference requests) to the ML models 118A-118D at an equal distribution (due to the equal weights) in which each model has an equal chance of being selected to perform an inference—e.g., 25%.

Figure 4:
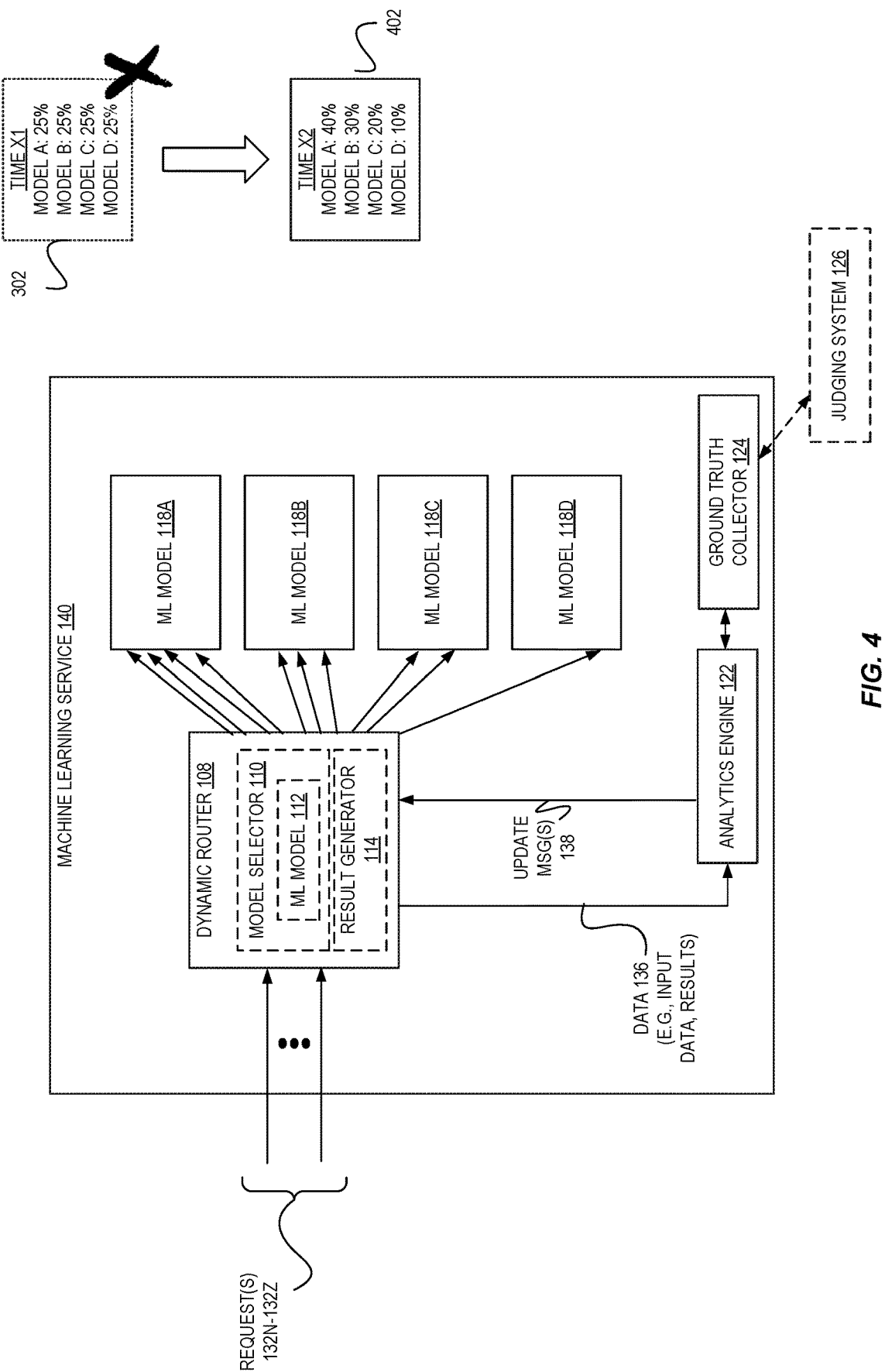
FIG. 4 is a diagram illustrating exemplary explore-and-exploit operations at a second point in time in the environment of FIG. 3 according to some embodiments.

Thereafter, by monitoring the performance of the models 118A-118D, the analytics engine 122 may determine that some models perform better than others, and cause (e.g., via update message(s) 138) the model selector 110 to change the distribution. For example, FIG. 4 is a diagram illustrating exemplary explore-and-exploit operations at a second point in time in the environment of FIG. 3 according to some embodiments. For example, in FIG. 4, at a point in time "X2" (represented by box 402) the model selector 110 may route requests 132A-132M (as inference requests) to the ML models 118A-118D with unequal distribution in which model A (e.g., ML model 118A) has a 40% chance of being selected to perform an inference, model B (e.g., ML model 118B) has a 30% chance of being selected to perform an inference, model C (e.g., ML model 118C) has a 20% chance of being selected to perform an inference, and model D (e.g., ML model 118D) has a 10% chance of being selected to perform an inference. Thus, more inference work is performed by those ML models that are performing better, and less inference work is performed by those ML models that are performing comparatively worse. In some embodiments, the weights (shown in box 402) can be used to weight particular inference results by a result generator 114 in determining how to determine a final result.

Figure 5:
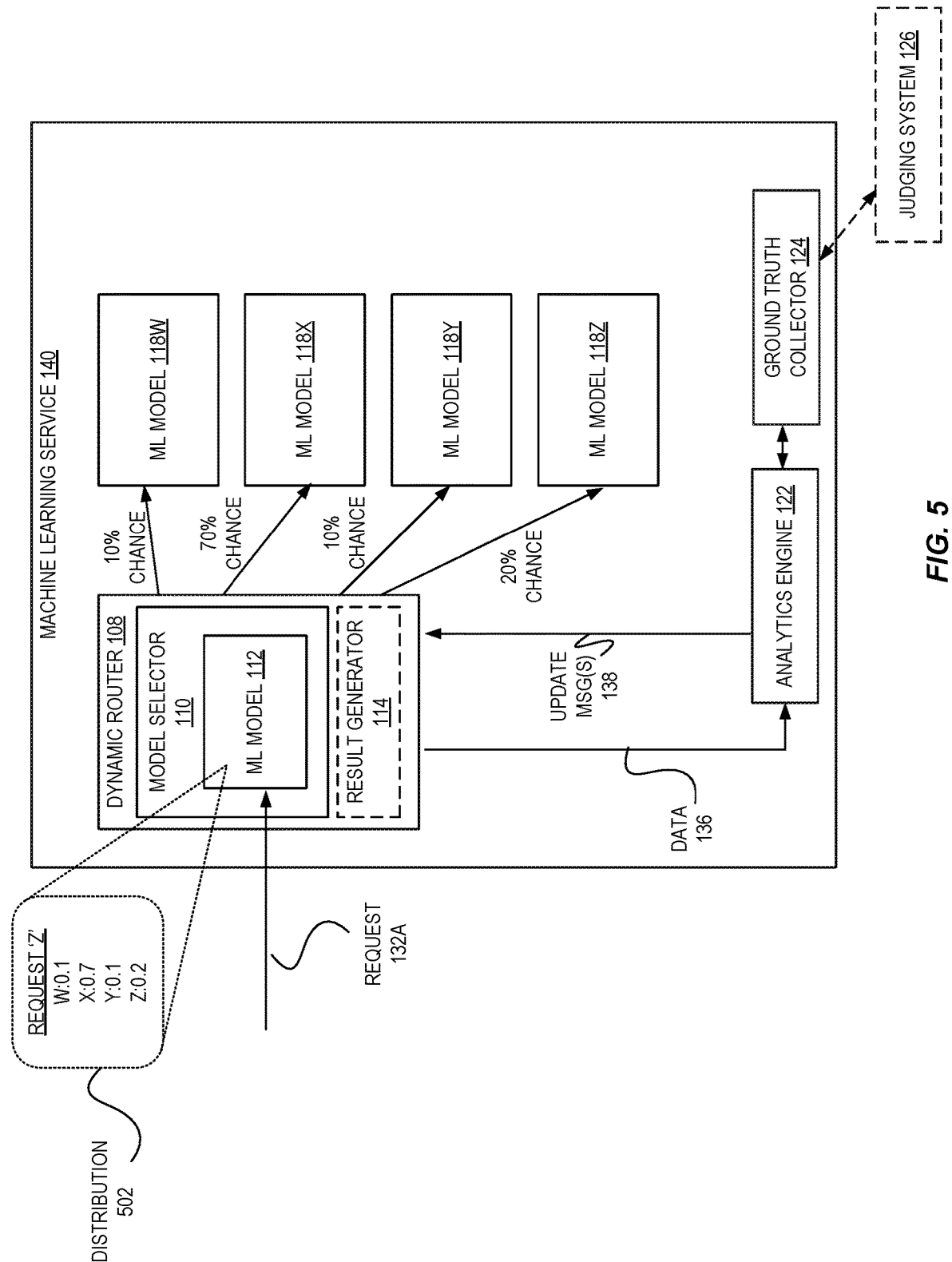
FIG. 5 is a diagram illustrating predictive model selection in an environment for dynamic accuracy-based experimentation and deployment of machine learning models according to some embodiments.

FIG. 5 is a diagram illustrating predictive model selection in an environment for dynamic accuracy-based experimentation and deployment of machine learning models according to some embodiments. In some embodiments, the machine learning service 140 predicts which ML model from a set of multiple candidate models (e.g., in a "group") is most likely to be the most accurate/performant for a particular request based on the request itself and/or other circumstances associated with the request (e.g., time of day, etc.) The model selector 110 thus, in some embodiments, utilizes a ML model 112 that evaluates a request as input to the model and outputs an identifier of which model is to be used (due to it, for example, being the most likely accurate), a set of identifiers of models, etc.

For example, multiple models 118W-118Z could be generated for performing a text translation from English to another language such as Spanish. The models 118W-118Z could differ in any of a variety of ways, such as the use of different ML algorithms, parameters/hyperparameters, training data, etc. The machine learning service 140 may thus execute these multiple models 118W-118Z (e.g., using actual requests, using synthetic requests, etc.)—possibly as shadow models—and monitor the performance/results of each of the models for different input requests via analytics engine 122 as described herein. Thus, machine learning service 140 can train a ML model 112 (e.g., via the model training system 130 of FIG. 1) using this monitored data such that the model 112 can identify characteristics of particular requests that indicate which of the multiple models will perform the best. In some embodiments, the ML model 112 may comprise multiple models—e.g., a first "deep" learning model (e.g., a neural network) to get some characteristics about a message, which feeds into a probability model that selects a model using the outputs of the first deep model.

Continuing the example, it is possible that one of the candidate models was trained (in whole or in a greater amount) using formal English, whereas a second of the candidate models was trained (in whole or in a greater relative amount) using informal or "slang" English. Thus, the model 112 may input a request (such as one using formal English), which can be analyzed to identify that it uses formal English and thus select a model (e.g., ML model 118W) from the group to be used. As indicated, the ML model 112 may identify only one model to be used, or may identify other models (e.g., a distribution 502 indicating identifiers of multiple models and corresponding percentages/weights, where a model with the highest weight can be selected, or a model from the set can be selected according to the distribution 502—e.g., a first model "W" is selected with 10% likelihood, a second model "X" is selected with 70% likelihood, etc.)

Thus, the model selector 110 can provide the selected model with an inference request, or can issue a command to have the selected model service the request (or to return its results, such as when a shadow execution is occurring).

Notably, the ML model 112 need not be absolutely perfect to provide a substantial increase in overall performance for the customer, as it only needs to be more correct than incorrect to yield value.

Figure 6:
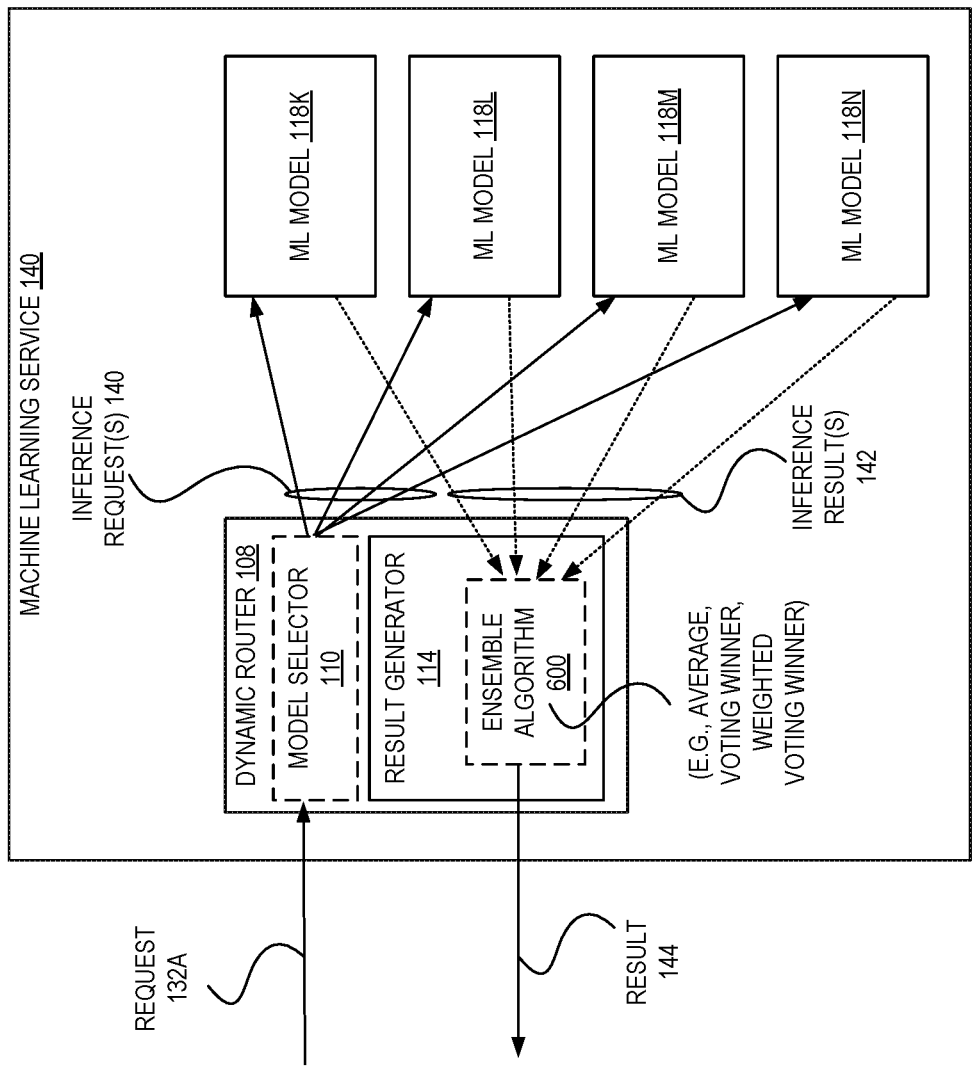
FIG. 6 is a diagram illustrating exemplary ensemble operations in an environment for dynamic accuracy-based experimentation and deployment of machine learning models according to some embodiments.

FIG. 6 is a diagram illustrating exemplary ensemble operations in an environment for dynamic accuracy-based experimentation and deployment of machine learning models according to some embodiments. In some embodiments, the machine learning service 140 uses an ensemble approach (e.g., averaging, voting, weighted voting, etc.) via result generator 114 to take the inference results 142 generated by multiple models to identify a result 144 to be returned for a request 132A.

For example, a group of models 118K-118N for a task may include five models, and one of these models may generally be much better than the rest. However, even a "best" model will still be incorrect some percentage of the time (e.g., 1%, 5%, etc.). Thus, it may be the case that the best model may be wrong in some cases, while at the same time, multiple of the other models (e.g., two, three, or four) may be correct. Thus, the result generator 114 may employ an ensemble algorithm 600—e.g., voting—to determine that the most popular (and likely correct) answer was not, in fact, provided by the "best" individual model.

In some embodiments, each model can have a same weight or "vote" as each other model. However, in some embodiments each model can be granted a weight based on a measured accuracy of the model (e.g., a model that has an accuracy score of 98% gets a weight of 0.98 while a model that has an accuracy score of 81% gets a weight of 0.81), a stipulated/configured weight indicated by the customer, etc.

Notably, embodiments utilizing such a result generator 114 with an ensemble algorithm 600 can provide a substantial increase in overall accuracy via such ensembling techniques without even needing to be aware of what the ML models 118K-118N are attempting to do or what the results even mean—instead, the machine learning service 140 may just need to understand when two models agree or disagree in terms of their output.

In some embodiments, the machine learning service 140 implements model ensemble estimation operations that can accurately evaluate the true accuracy of various models in a group (task) despite these models not possibly even servicing much traffic. For example, a group may have a set of sixty associated ML models. At the end of a day, it may be desirable to know how a certain model would have performed had it been solely responsible for service all requests during that day. However, this is traditionally difficult if not impossible to perform—e.g., if a model (e.g., #52) didn't serve any requests, or many requests, or work in a "representative" way (e.g., servicing a representative grouping of requests, as opposed to serving some skewed/non-representative group of requests)—then it is impossible to really know how well that model worked.

Accordingly, in some embodiments the machine learning service 140 can distribute requests according to some distribution over all models, and keep track of what distribution was employed, and which requests were assigned to which models. Using this tracked data—e.g., the distribution and which requests were assigned to which models and how these models performed—the machine learning service 140 can mathematically construct an unbiased estimate of how well any particular model would have performed had it been the only one in the system.

Moreover, with this information, the machine learning service 140 also can create a dataset on which a particular model (e.g., #52) can be trained/retrained as if it had actually received all the requests. For example, if a model only services requests during a first half of a day, and the model is retrained on that set of traffic, then the model becomes biased to that part of the traffic. However, if requests are assigned in a randomized manner as described herein, the model can be trained to be effective on the entire dataset of requests, even though a particular model hasn't seen everything.

Thus, given a particular sample, and something is known about the bias in that sample (e.g., 80% of traffic is sent to a first model, while 20% is sent to a second model), these probabilities can be used to "un-bias" the accuracy of these models (using known statistical techniques for removing bias in samples as is known to those of skill in the art) to reflect how each model would have done had they serviced all of the traffic. As a result, embodiments can provide an understanding to a user if the simple use of just one model—instead of two or more—is sufficient, which can be particularly beneficial when certain models are hard to generate.

Moreover, some embodiments can create a dataset on which a model can be retrained as if it had received all requests. For example, in some embodiments the machine learning service 140 can generate new training data, e.g., by use of probabilistic data to create new synthetic samples. As another example, in some embodiments the machine learning service 140 can create labels if ground truth exists or multiple models exist (via ensembling) to allow a "broken" model to be re-trained. As another example, sometimes the amount of data that creates a certain result in a model (e.g., looking for malicious activity in networks, which is a very small occurrence compared to the extremely high amount of non-malicious traffic) the number of positives is small, and thus models seeking to find such results are hard to train. However, embodiments disclosed herein can take those positives that exist in the dataset, and generate more of them with slightly different data values to thus "multiply" the amount of positive samples—e.g., instead of a training dataset of 1% positives, embodiments can "multiply" them to make it like 50/50.

In some embodiments, the use of one or more of these techniques can be configured by the customer using an API of a provider network 100 (e.g., via HTTP requests issued to an API endpoint 106 of a provider network 100). For example, a customer may use a user interface (UI) of a program/application/console to create a group of models that are associated with a particular group or "task," and then can indicate how the customer wishes the group of models to be utilized. For example, the customer could indicate whether the customer desires shadow running of the models, and/or predictive selection, and/or ensembling, etc.

Further, embodiments can provide visual feedback to users of the operations described herein, e.g., in the form of a dashboard (e.g., web-based, standalone application, etc.). The dashboard could show, for example, real-time feedback such as how much traffic is getting routed to what models, what are the most-recently computed accuracy scores of the models, etc. Moreover, the dashboard could be interactive and allow a user to change how traffic is passed to models, add models to groups, pull models out of groups, etc., and can also have alarming and alerting (e.g., to indicate that a model is not performing well).

Figure 7:
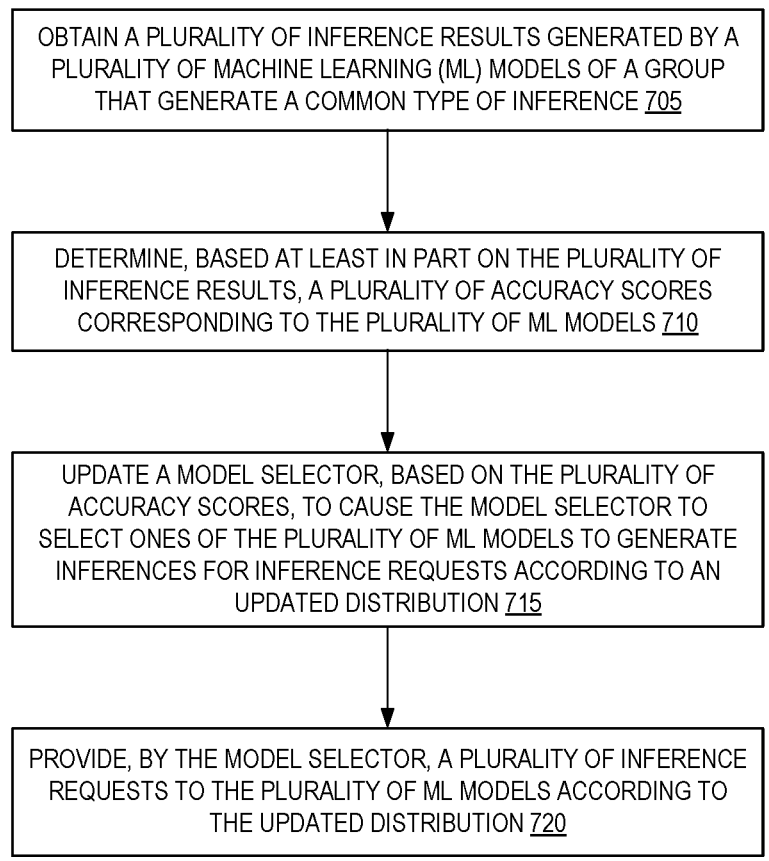
FIG. 7 is a diagram illustrating operations of a method for dynamic accuracy-based deployment of machine learning models according to some embodiments.

FIG. 7 is a flow diagram illustrating operations 1000 of a method for dynamic accuracy-based deployment of machine learning models according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by the machine learning service 140 of the other figures, such as via analytics engine 122 and/or dynamic router 108.

The operations 700 include, at block 705, obtaining a plurality of inference results generated by a plurality of ML models of a group that generate a common type of inference. Block 705 can be performed, for example, by the analytics engine 122, and the inference results may be provided from a dynamic router 108. Each of the ML models may execute within a container, and optionally the dynamic router 108 and/or analytics engine 122 may also execute within a same or different container.

At block 710, the operations 700 include determining, based at least in part on the plurality of inference results, a plurality of accuracy scores corresponding to the plurality of ML models. Block 710 may be performed by the analytics engine 122 of the other figures, and may include interacting with a ground truth collector and/or judging system to obtain the "ground truth" for particular input data elements. Block 710 may also include comparing the plurality of inference results generated by the plurality of ML models with the obtained ground truth values, and assigning an accuracy score for a model based on how frequent and/or how similar that model's inference results match the corresponding ground truth values.

The operations 700 also include, at block 715, updating a model selector, based on the plurality of accuracy scores, to cause the model selector to select ones of the plurality of ML models to generate inferences for inference requests according to an updated distribution. Block 715 may be performed by the analytics engine 122 of the other figures, and may include generating and deploying an updated ML model 112 (e.g., via a model training system 130), sending an update message 138 with details about the new distribution/weighting, etc.

At block 720, the operations 700 include providing, by the model selector, a plurality of inference requests to the plurality of ML models according to the updated distribution. Block 720 can include receiving the plurality of requests, using the plurality of requests (or data therefrom) by the model selector 110 (e.g., possibly a predictive ML model 112) to identify one or more ML models to provide inference requests to, and sending (or providing via another technique, such as the use of shared memory, arguments to a function call, etc.) the inference requests to the models.

Figure 8:
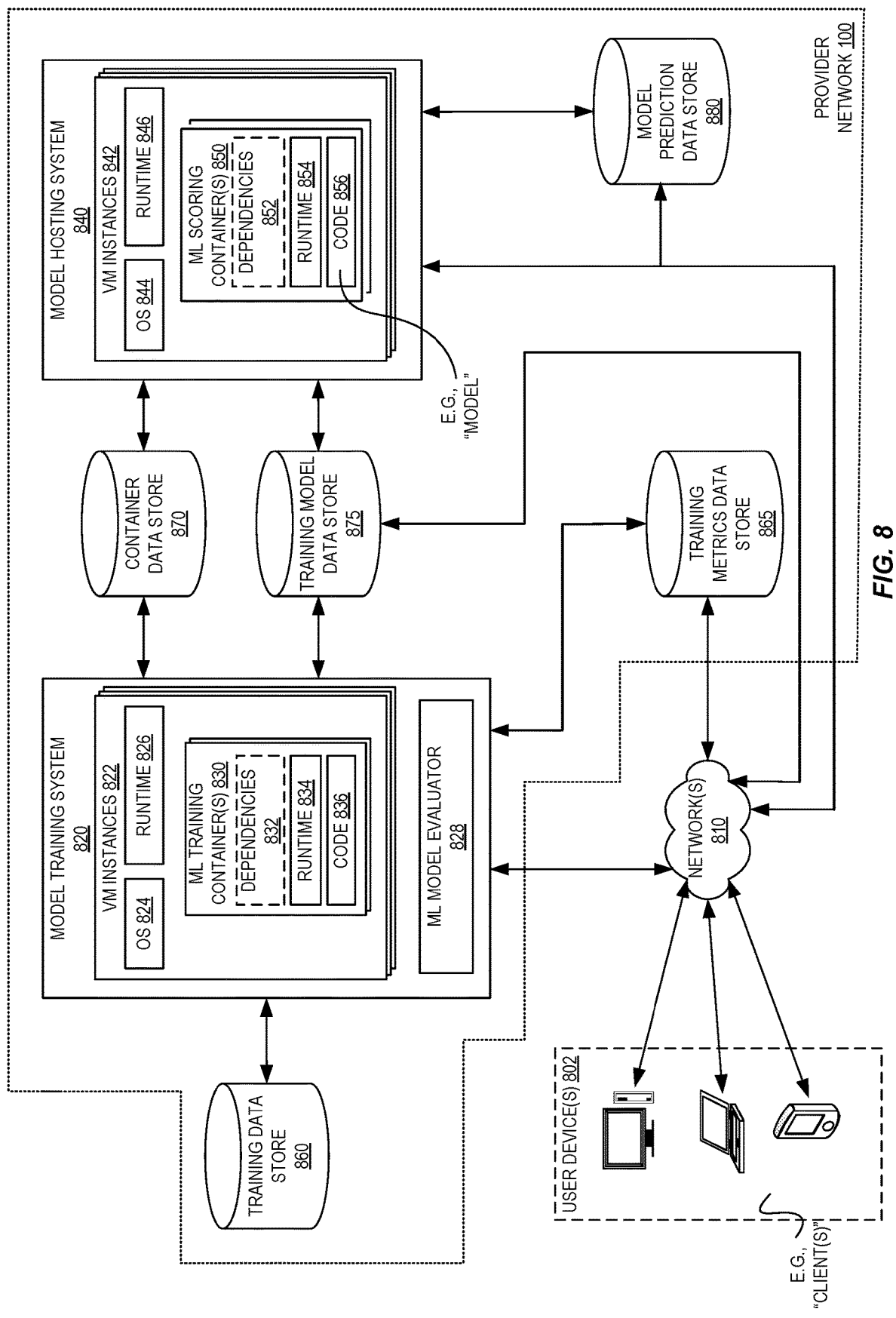
FIG. 8 is a block diagram of an illustrative operating environment in which machine learning models are trained and hosted according to some embodiments.

FIG. 8 is a block diagram of an illustrative operating environment in which machine learning models are trained and hosted according to some embodiments. The operating environment includes end user devices 802, a model training system 820, a model hosting system 840, a training data store 860, a training metrics data store 865, a container data store 870, a training model data store 875, and a model prediction data store 880.

The machine learning service 140 described herein may include one or more of these entities, such as the model hosting system 840, model training system 820, etc. For example, in some embodiments the ML models 118 of the earlier figures may be run by model hosting system 840.

In some embodiments, users, by way of user devices 802, interact with the model training system 820 to provide data that causes the model training system 820 to train one or more machine learning models. A machine learning model, generally, may be thought of as one or more equations that are "trained" using a set of data. In some embodiments, the model training system 820 provides ML functionalities as a Web service, and thus messaging between user devices 802 and the model training system 820 (or provider network 100), and/or between components of the model training system 820 (or provider network 100), may utilize HTTP messages to transfer data in a machine-readable file format, such as eXtensible Markup Language (XML) or JavaScript Object Notation (JSON).

The user devices 802 can interact with the model training system 820 via frontend 829 of the model training system 820. For example, a user device 802 can provide a training request to the frontend 829 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 802, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 802 may provide, in the training request, an algorithm written in any programming language. The model training system 820 then packages the algorithm into a container (optionally with other code, such as a "base" ML algorithm supplemented with user-provided code) that is eventually loaded into a virtual machine instance 822 for training a machine learning model, as described in greater detail below. For example, a user, via a user device 802, may develop an algorithm/code using an application (e.g., an interactive web-based programming environment) and cause the algorithm/code to be provided—perhaps as part of a training request (or referenced in a training request)—to the model training system 820, where this algorithm/code may be containerized on its own or used together with an existing container having a machine learning framework, for example.

In some embodiments, instead of providing a container image in the training request, the user device 802 provides, in the training request, an indicator of a container image (e.g., an indication of an address or a location at which a container image is stored). For example, the container image can be stored in a container data store 870, and this container image may have been previously created/uploaded by the user. The model training system 820 can retrieve the container image from the indicated location and create a container using the retrieved container image. The container is then loaded into a virtual machine instance 822 for training a machine learning model, as described in greater detail below.

The model training system 820 can use the information provided by the user device 802 to train a machine learning model in one or more pre-established virtual machine instances 822 in some embodiments. In particular, the model training system 820 includes a single physical computing device or multiple physical computing devices that are interconnected using one or more computing networks (not shown), where the physical computing device(s) host one or more virtual machine instances 822. The model training system 820 can handle the acquisition and configuration of compute capacity (e.g., containers, instances, etc., which are described in greater detail below) based on the information describing the computing machine on which to train a machine learning model provided by the user device 802. The model training system 820 can then train machine learning models using the compute capacity, as is described in greater detail below. The model training system 820 can automatically scale up and down based on the volume of training requests received from user devices 802 via frontend 829, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 822 are utilized to execute tasks. For example, such tasks can include training a machine learning model. As shown in FIG. 8, each virtual machine instance 822 includes an operating system (OS) 824, a language runtime 826, and one or more ML training containers 830. Generally, the ML training containers 830 are logical units created within a virtual machine instance using the resources available on that instance, and can be utilized to isolate execution of a task from other processes (e.g., task executions) occurring in the instance. In some embodiments, the ML training containers 830 are formed from one or more container images and a top container layer. Each container image may further include one or more image layers, where each image layer represents an executable instruction. As described above, some or all of the executable instructions together represent an algorithm that defines a machine learning model. Changes made to the ML training containers 830 (e.g., creation of new files, modification of existing files, deletion of files, etc.) are stored in the top container layer. If a ML training container 830 is deleted, the top container layer is also deleted. However, the container image(s) that form a portion of the deleted ML training container 830 can remain unchanged. The ML training containers 830 can be implemented, for example, as Linux containers (LXC), Docker containers, and the like.

The ML training containers 830 may include individual a runtime 834, code 836, and dependencies 832 needed by the code 836 in some embodiments. The OS 832 and/or the runtime 834 can be defined by one or more executable instructions that form at least a portion of a container image that is used to form the ML training container 830 (e.g., the executable instruction(s) in the container image that define the operating system and/or runtime to run in the container formed from the container image). The code 836 includes one or more executable instructions that form at least a portion of a container image that is used to form the ML training container 830. For example, the code 836 includes the executable instructions in the container image that represent an algorithm that defines a machine learning model. The OS 832 and/or runtime 834 are configured to execute the code 836 in response to an instruction to begin machine learning model training. Execution of the code 836 results in the generation of model data, as described in greater detail below.

In some embodiments, the code 836 includes executable instructions that represent algorithms that define different machine learning models. For example, the code 836 includes one set of executable instructions that represent a first algorithm that defines a first machine learning model and a second set of executable instructions that represent a second algorithm that defines a second machine learning model. In some embodiments, the virtual machine instance 822 executes the code 836 and trains all of the machine learning models. In some embodiments, the virtual machine instance 822 executes the code 836, selecting one of the machine learning models to train. For example, the virtual machine instance 822 can identify a type of training data indicated by the training request and select a machine learning model to train (e.g., execute the executable instructions that represent an algorithm that defines the selected machine learning model) that corresponds with the identified type of training data.

In some embodiments, the OS 832 and the runtime 834 are the same as the OS 824 and runtime 826 utilized by the virtual machine instance 822. In some embodiments, the OS 832 and/or the runtime 834 are different than the OS 824 and/or runtime 826 utilized by the virtual machine instance 822.

In some embodiments, the model training system 820 uses one or more container images included in a training request (or a container image retrieved from the container data store 870 in response to a received training request) to create and initialize a ML training container 830 in a virtual machine instance 822. For example, the model training system 820 creates a ML training container 830 that includes the container image(s) and/or a top container layer.

Prior to beginning the training process, in some embodiments, the model training system 820 retrieves training data from the location indicated in the training request. For example, the location indicated in the training request can be a location in the training data store 860. Thus, the model training system 820 retrieves the training data from the indicated location in the training data store 860. In some embodiments, the model training system 820 does not retrieve the training data prior to beginning the training process. Rather, the model training system 820 streams the training data from the indicated location during the training process. For example, the model training system 820 can initially retrieve a portion of the training data and provide the retrieved portion to the virtual machine instance 822 training the machine learning model. Once the virtual machine instance 822 has applied and used the retrieved portion or once the virtual machine instance 822 is about to use all of the retrieved portion (e.g., a buffer storing the retrieved portion is nearly empty), then the model training system 820 can retrieve a second portion of the training data and provide the second retrieved portion to the virtual machine instance 822, and so on.

To perform the machine learning model training, the virtual machine instance 822 executes code 836 stored in the ML training container 830 in some embodiments. For example, the code 836 includes some or all of the executable instructions that form the container image of the ML training container 830 initialized therein. Thus, the virtual machine instance 822 executes some or all of the executable instructions that form the container image of the ML training container 830 initialized therein to train a machine learning model. The virtual machine instance 822 executes some or all of the executable instructions according to the hyperparameter values included in the training request. As an illustrative example, the virtual machine instance 822 trains a machine learning model by identifying values for certain parameters (e.g., coefficients, weights, centroids, etc.). The identified values depend on hyperparameters that define how the training is performed. Thus, the virtual machine instance 822 can execute the executable instructions to initiate a machine learning model training process, where the training process is run using the hyperparameter values included in the training request. Execution of the executable instructions can include the virtual machine instance 822 applying the training data retrieved by the model training system 820 as input parameters to some or all of the instructions being executed.

In some embodiments, executing the executable instructions causes the virtual machine instance 822 (e.g., the ML training container 830) to generate model data. For example, the ML training container 830 generates model data and stores the model data in a file system of the ML training container 830. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 830 such that the model data is written to the top container layer of the ML training container 830 and/or the container image(s) that forms a portion of the ML training container 830 is modified to include the model data.

The virtual machine instance 822 (or the model training system 820 itself) pulls the generated model data from the ML training container 830 and stores the generated model data in the training model data store 875 in an entry associated with the virtual machine instance 822 and/or the machine learning model being trained. In some embodiments, the virtual machine instance 822 generates a single file that includes model data and stores the single file in the training model data store 875. In some embodiments, the virtual machine instance 822 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 822 can package the multiple files into a single file once training is complete and store the single file in the training model data store 875. Alternatively, the virtual machine instance 822 stores the multiple files in the training model data store 875. The virtual machine instance 822 stores the file(s) in the training model data store 875 while the training process is ongoing and/or after the training process is complete.

In some embodiments, the virtual machine instance 822 regularly stores model data file(s) in the training model data store 875 as the training process is ongoing. Thus, model data file(s) can be stored in the training model data store 875 at different times during the training process. Each set of model data files corresponding to a particular time or each set of model data files present in the training model data store 875 as of a particular time could be checkpoints that represent different versions of a partially-trained machine learning model during different stages of the training process. Accordingly, before training is complete, a user, via the user device 802 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 875.

In some embodiments, a virtual machine instance 822 executes code 836 stored in a plurality of ML training containers 830. For example, the algorithm included in the container image can be in a format that allows for the parallelization of the training process. Thus, the model training system 820 can create multiple copies of the container image provided in a training request and cause the virtual machine instance 822 to load each container image copy in a separate ML training container 830. The virtual machine instance 822 can then execute, in parallel, the code 836 stored in the ML training containers 830. The virtual machine instance 822 can further provide configuration information to each ML training container 830 (e.g., information indicating that N ML training containers 830 are collectively training a machine learning model and that a particular ML training container 830 receiving the configuration information is ML training container 830 number X of N), which can be included in the resulting model data. By parallelizing the training process, the model training system 820 can significantly reduce the training time in some embodiments.

In some embodiments, a plurality of virtual machine instances 822 execute code 836 stored in a plurality of ML training containers 830. For example, the resources used to train a particular machine learning model can exceed the limitations of a single virtual machine instance 822. However, the algorithm included in the container image can be in a format that allows for the parallelization of the training process. Thus, the model training system 820 can create multiple copies of the container image provided in a training request, initialize multiple virtual machine instances 822, and cause each virtual machine instance 822 to load a container image copy in one or more separate ML training containers 830. The virtual machine instances 822 can then each execute the code 836 stored in the ML training containers 830 in parallel. The model training system 820 can further provide configuration information to each ML training container 830 via the virtual machine instances 822 (e.g., information indicating that N ML training containers 830 are collectively training a machine learning model and that a particular ML training container 830 receiving the configuration information is ML training container 830 number X of N, information indicating that M virtual machine instances 822 are collectively training a machine learning model and that a particular ML training container 830 receiving the configuration information is initialized in virtual machine instance 822 number Y of M, etc.), which can be included in the resulting model data. As described above, by parallelizing the training process, the model training system 820 can significantly reduce the training time in some embodiments.

In some embodiments, the model training system 820 includes a plurality of physical computing devices and two or more of the physical computing devices hosts one or more virtual machine instances 822 that execute the code 836. Thus, the parallelization can occur over different physical computing devices in addition to over different virtual machine instances 822 and/or ML training containers 830.

In some embodiments, the model training system 820 includes a ML model evaluator 828. The ML model evaluator 828 can monitor virtual machine instances 822 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 828 can obtain the model data for a machine learning model being trained and evaluation data from the training data store 860. The evaluation data is separate from the data used to train a machine learning model and includes both input data and expected outputs (e.g., known results), and thus the ML model evaluator 828 can define a machine learning model using the model data and execute the machine learning model by providing the input data as inputs to the machine learning model. The ML model evaluator 828 can then compare the outputs of the machine learning model to the expected outputs, and determine one or more quality metrics of the machine learning model being trained based on the comparison (e.g., the error rate can be a difference or distance between the machine learning model outputs and the expected outputs).

The ML model evaluator 828 periodically generates model metrics during the training process and stores the model metrics in the training metrics data store 865 in some embodiments. While the machine learning model is being trained, a user, via the user device 802, can access and retrieve the model metrics from the training metrics data store 865. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 802, can transmit a request to the model training system 820 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 820 can modify the machine learning model accordingly. For example, the model training system 820 can cause the virtual machine instance 822 to optionally delete an existing ML training container 830, create and initialize a new ML training container 830 using some or all of the information included in the request, and execute the code 836 stored in the new ML training container 830 to restart the machine learning model training process. As another example, the model training system 820 can cause the virtual machine instance 822 to modify the execution of code stored in an existing ML training container 830 according to the data provided in the modification request. In some embodiments, the user, via the user device 802, can transmit a request to the model training system 820 to stop the machine learning model training process. The model training system 820 can then instruct the virtual machine instance 822 to delete the ML training container 830 and/or to delete any model data stored in the training model data store 875.

As described below, in some embodiments, the model data stored in the training model data store 875 is used by the model hosting system 840 to deploy machine learning models. Alternatively or in addition, a user device 802 or another computing device (not shown) can retrieve the model data from the training model data store 875 to implement a learning algorithm in an external device. As an illustrative example, a robotic device can include sensors to capture input data. A user device 802 can retrieve the model data from the training model data store 875 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 822 are shown in FIG. 8 as a single grouping of virtual machine instances 822, some embodiments of the present application separate virtual machine instances 822 that are actively assigned to execute tasks from those virtual machine instances 822 that are not actively assigned to execute tasks. For example, those virtual machine instances 822 actively assigned to execute tasks are grouped into an "active pool," while those virtual machine instances 822 not actively assigned to execute tasks are placed within a "warming pool." In some embodiments, those virtual machine instances 822 within the warming pool can be pre-initialized with an operating system, language runtimes, and/or other software required to enable rapid execution of tasks (e.g., rapid initialization of machine learning model training in ML training container(s) 830) in response to training requests.

In some embodiments, the model training system 820 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 802, the model hosting system 840, etc.). The processing unit can also communicate to and from a memory of a virtual machine instance 822 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 840 includes a single physical computing device or multiple physical computing devices that are interconnected using one or more computing networks (not shown), where the physical computing device(s) host one or more virtual machine instances 842. The model hosting system 840 can handle the acquisition and configuration of compute capacity (e.g., containers, instances, etc.) based on demand for the execution of trained machine learning models. The model hosting system 840 can then execute machine learning models using the compute capacity, as is described in greater detail below. The model hosting system 840 can automatically scale up and down based on the volume of execution requests received from user devices 802 via frontend 849 of the model hosting system 840, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 842 are utilized to execute tasks. For example, such tasks can include executing a machine learning model. As shown in FIG. 8, each virtual machine instance 842 includes an operating system (OS) 844, a language runtime 846, and one or more ML scoring containers 850. The ML scoring containers 850 are similar to the ML training containers 830 in that the ML scoring containers 850 are logical units created within a virtual machine instance using the resources available on that instance, and can be utilized to isolate execution of a task from other processes (e.g., task executions) occurring in the instance. In some embodiments, the ML scoring containers 850 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 850 (e.g., creation of new files, modification of existing files, deletion of files, etc.) are stored in the top container layer. If a ML scoring container 850 is deleted, the top container layer is also deleted. However, the container image(s) that form a portion of the deleted ML scoring container 850 can remain unchanged. The ML scoring containers 850 can be implemented, for example, as Linux containers.

The ML scoring containers 850 each include a runtime 854, code 856, and dependencies 852 needed by the code 856 in some embodiments. The OS 852 and/or the runtime 854 can be defined by one or more executable instructions that form at least a portion of a container image that is used to form the ML scoring container 850 (e.g., the executable instruction(s) in the container image that define the operating system and/or runtime to run in the container formed from the container image). The code 856 includes one or more executable instructions that form at least a portion of a container image that is used to form the ML scoring container 850. For example, the code 856 includes the executable instructions in the container image that represent an algorithm that defines a machine learning model. The code 856 can also include model data that represent characteristics of the defined machine learning model, as described in greater detail below. The OS 852 and/or runtime 854 are configured to execute the code 856 in response to an instruction to begin execution of a machine learning model. Execution of the code 856 results in the generation of outputs (e.g., predicted results), as described in greater detail below.

In some embodiments, the OS 852 and the runtime 854 are the same as the OS 844 and runtime 846 utilized by the virtual machine instance 842. In some embodiments, the OS 852 and/or the runtime 854 are different than the OS 844 and/or runtime 846 utilized by the virtual machine instance 842.

In some embodiments, the model hosting system 840 uses one or more container images included in a deployment request (or a container image retrieved from the container data store 870 in response to a received deployment request) to create and initialize a ML scoring container 850 in a virtual machine instance 842. For example, the model hosting system 840 creates a ML scoring container 850 that includes the container image(s) and/or a top container layer.

As described above, a user device 802 can submit a deployment request and/or an execution request to the model hosting system 840 via the frontend 849 in some embodiments. A deployment request causes the model hosting system 840 to deploy a trained machine learning model into a virtual machine instance 842. For example, the deployment request can include an identification of an endpoint (e.g., an endpoint name, such as an HTTP endpoint name) and an identification of one or more trained machine learning models (e.g., a location of one or more model data files stored in the training model data store 875). Optionally, the deployment request also includes an identification of one or more container images stored in the container data store 870.

Upon receiving the deployment request, the model hosting system 840 initializes ones or more ML scoring containers 850 in one or more hosted virtual machine instance 842. In embodiments in which the deployment request includes an identification of one or more container images, the model hosting system 840 forms the ML scoring container(s) 850 from the identified container image(s). For example, a container image identified in a deployment request can be the same container image used to form an ML training container 830 used to train the machine learning model corresponding to the deployment request. Thus, the code 856 of the ML scoring container(s) 850 includes one or more executable instructions in the container image(s) that represent an algorithm that defines a machine learning model. In embodiments in which the deployment request does not include an identification of a container image, the model hosting system 840 forms the ML scoring container(s) 850 from one or more container images stored in the container data store 870 that are appropriate for executing the identified trained machine learning model(s). For example, an appropriate container image can be a container image that includes executable instructions that represent an algorithm that defines the identified trained machine learning model(s).

The model hosting system 840 further forms the ML scoring container(s) 850 by retrieving model data corresponding to the identified trained machine learning model(s) in some embodiments. For example, the deployment request can identify a location of model data file(s) stored in the training model data store 875. In embodiments in which a single model data file is identified in the deployment request, the model hosting system 840 retrieves the identified model data file from the training model data store 875 and inserts the model data file into a single ML scoring container 850, which forms a portion of code 856. In some embodiments, the model data file is archived or compressed (e.g., formed from a package of individual files). Thus, the model hosting system 840 unarchives or decompresses the model data file to obtain multiple individual files, and inserts the individual files into the ML scoring container 850. In some embodiments, the model hosting system 840 stores the model data file in the same location as the location in which the model data file was stored in the ML training container 830 that generated the model data file. For example, the model data file initially was stored in the top container layer of the ML training container 830 at a certain offset, and the model hosting system 840 then stores the model data file in the top container layer of the ML scoring container 850 at the same offset.

In embodiments in which multiple model data files are identified in the deployment request, the model hosting system 840 retrieves the identified model data files from the training model data store 875. The model hosting system 840 can insert the model data files into the same ML scoring container 850, into different ML scoring containers 850 initialized in the same virtual machine instance 842, or into different ML scoring containers 850 initialized in different virtual machine instances 842. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 840 associates the initialized ML scoring container(s) 850 with the endpoint identified in the deployment request. For example, each of the initialized ML scoring container(s) 850 can be associated with a network address. The model hosting system 840 can map the network address(es) to the identified endpoint, and the model hosting system 840 or another system (e.g., a routing system, not shown) can store the mapping. Thus, a user device 802 can refer to trained machine learning model(s) stored in the ML scoring container(s) 850 using the endpoint. This allows for the network address of an ML scoring container 850 to change without causing the user operating the user device 802 to change the way in which the user refers to a trained machine learning model.

Once the ML scoring container(s) 850 are initialized, the ML scoring container(s) 850 are ready to execute trained machine learning model(s). In some embodiments, the user device 802 transmits an execution request to the model hosting system 840 via the frontend 849, where the execution request identifies an endpoint and includes an input to a machine learning model (e.g., a set of input data). The model hosting system 840 or another system (e.g., a routing system, not shown) can obtain the execution request, identify the ML scoring container(s) 850 corresponding to the identified endpoint, and route the input to the identified ML scoring container(s) 850.

In some embodiments, a virtual machine instance 842 executes the code 856 stored in an identified ML scoring container 850 in response to the model hosting system 840 receiving the execution request. In particular, execution of the code 856 causes the executable instructions in the code 856 corresponding to the algorithm to read the model data file stored in the ML scoring container 850, use the input included in the execution request as an input parameter, and generate a corresponding output. As an illustrative example, the algorithm can include coefficients, weights, layers, cluster centroids, and/or the like. The executable instructions in the code 856 corresponding to the algorithm can read the model data file to determine values for the coefficients, weights, layers, cluster centroids, and/or the like. The executable instructions can include input parameters, and the input included in the execution request can be supplied by the virtual machine instance 842 as the input parameters. With the machine learning model characteristics and the input parameters provided, execution of the executable instructions by the virtual machine instance 842 can be completed, resulting in an output.

In some embodiments, the virtual machine instance 842 stores the output in the model prediction data store 880. Alternatively or in addition, the virtual machine instance 842 transmits the output to the user device 802 that submitted the execution result via the frontend 849.

In some embodiments, the execution request corresponds to a group of related trained machine learning models. Thus, the ML scoring container 850 can transmit the output to a second ML scoring container 850 initialized in the same virtual machine instance 842 or in a different virtual machine instance 842. The virtual machine instance 842 that initialized the second ML scoring container 850 can then execute second code 856 stored in the second ML scoring container 850, providing the received output as an input parameter to the executable instructions in the second code 856. The second ML scoring container 850 further includes a model data file stored therein, which is read by the executable instructions in the second code 856 to determine values for the characteristics defining the machine learning model. Execution of the second code 856 results in a second output. The virtual machine instance 842 that initialized the second ML scoring container 850 can then transmit the second output to the model prediction data store 880 and/or the user device 802 via the frontend 849 (e.g., if no more trained machine learning models are needed to generate an output) or transmit the second output to a third ML scoring container 850 initialized in the same or different virtual machine instance 842 (e.g., if outputs from one or more additional trained machine learning models are needed), and the above-referenced process can be repeated with respect to the third ML scoring container 850.

While the virtual machine instances 842 are shown in FIG. 8 as a single grouping of virtual machine instances 842, some embodiments of the present application separate virtual machine instances 842 that are actively assigned to execute tasks from those virtual machine instances 842 that are not actively assigned to execute tasks. For example, those virtual machine instances 842 actively assigned to execute tasks are grouped into an "active pool," while those virtual machine instances 842 not actively assigned to execute tasks are placed within a "warming pool." In some embodiments, those virtual machine instances 842 within the warming pool can be pre-initialized with an operating system, language runtimes, and/or other software required to enable rapid execution of tasks (e.g., rapid initialization of ML scoring container(s) 850, rapid execution of code 856 in ML scoring container(s), etc.) in response to deployment and/or execution requests.

In some embodiments, the model hosting system 840 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 802, the model training system 820, etc.). The processing unit can also communicate to and from a memory of a virtual machine instance 842 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment 800 supports many different types of machine learning models, such as multi arm bandit models, reinforcement learning models, ensemble machine learning models, deep learning models, and/or the like.

The model training system 820 and the model hosting system 840 depicted in FIG. 8 are not meant to be limiting. For example, the model training system 820 and/or the model hosting system 840 could also operate within a computing environment having a fewer or greater number of devices than are illustrated in FIG. 8. Thus, the depiction of the model training system 820 and/or the model hosting system 840 in FIG. 8 may be taken as illustrative and not limiting to the present disclosure. For example, the model training system 820 and/or the model hosting system 840 or various constituents thereof could implement various Web services components, hosted or "cloud" computing environments, and/or peer-to-peer network configurations to implement at least a portion of the processes described herein. In some embodiments, the model training system 820 and/or the model hosting system 840 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 829 processes all training requests received from user devices 802 and provisions virtual machine instances 822. In some embodiments, the frontend 829 serves as a front door to all the other services provided by the model training system 820. The frontend 829 processes the requests and makes sure that the requests are properly authorized. For example, the frontend 829 may determine whether the user associated with the training request is authorized to initiate the training process.

Similarly, frontend 849 processes all deployment and execution requests received from user devices 802 and provisions virtual machine instances 842. In some embodiments, the frontend 849 serves as a front door to all the other services provided by the model hosting system 840. The frontend 849 processes the requests and makes sure that the requests are properly authorized. For example, the frontend 849 may determine whether the user associated with a deployment request or an execution request is authorized to access the indicated model data and/or to execute the indicated machine learning model.

The training data store 860 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 860 is depicted as being located external to the model training system 820 and the model hosting system 840, this is not meant to be limiting. For example, in some embodiments not shown, the training data store 860 is located internal to at least one of the model training system 820 or the model hosting system 840.

In some embodiments, the training metrics data store 865 stores model metrics. While the training metrics data store 865 is depicted as being located external to the model training system 820 and the model hosting system 840, this is not meant to be limiting. For example, in some embodiments not shown, the training metrics data store 865 is located internal to at least one of the model training system 820 or the model hosting system 840.

The container data store 870 stores container images, such as container images used to form ML training containers 830 and/or ML scoring containers 850, that can be retrieved by various virtual machine instances 822 and/or 842. While the container data store 870 is depicted as being located external to the model training system 820 and the model hosting system 840, this is not meant to be limiting. For example, in some embodiments not shown, the container data store 870 is located internal to at least one of the model training system 820 and the model hosting system 840.

The training model data store 875 stores model data files. In some embodiments, some of the model data files are comprised of a single file, while other model data files are packages of multiple individual files. While the training model data store 875 is depicted as being located external to the model training system 820 and the model hosting system 840, this is not meant to be limiting. For example, in some embodiments not shown, the training model data store 875 is located internal to at least one of the model training system 820 or the model hosting system 840.

The model prediction data store 880 stores outputs (e.g., execution results) generated by the ML scoring containers 850 in some embodiments. While the model prediction data store 880 is depicted as being located external to the model training system 820 and the model hosting system 840, this is not meant to be limiting. For example, in some embodiments not shown, the model prediction data store 880 is located internal to at least one of the model training system 820 and the model hosting system 840.

While the model training system 820, the model hosting system 840, the training data store 860, the training metrics data store 865, the container data store 870, the training model data store 875, and the model prediction data store 880 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 802 via the network 810.

Various example user devices 802 are shown in FIG. 8, including a desktop computer, laptop, and a mobile phone, each provided by way of illustration. In general, the user devices 802 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 820 and/or the model hosting system 840 provides the user devices 802 with one or more user interfaces, command-line interfaces (CLI), application programming interfaces (API), and/or other programmatic interfaces for submitting training requests, deployment requests, and/or execution requests. In some embodiments, the user devices 802 can execute a stand-alone application that interacts with the model training system 820 and/or the model hosting system 840 for submitting training requests, deployment requests, and/or execution requests.

In some embodiments, the network 810 includes any wired network, wireless network, or combination thereof. For example, the network 810 may be a personal area network, local area network, wide area network, over-the-air broadcast network (e.g., for radio or television), cable network, satellite network, cellular telephone network, or combination thereof. As a further example, the network 810 may be a publicly accessible network of linked networks, possibly operated by various distinct parties, such as the Internet. In some embodiments, the network 810 may be a private or semi-private network, such as a corporate or university intranet. The network 810 may include one or more wireless networks, such as a Global System for Mobile Communications (GSM) network, a Code Division Multiple Access (CDMA) network, a Long Term Evolution (LTE) network, or any other type of wireless network. The network 810 can use protocols and components for communicating via the Internet or any of the other aforementioned types of networks. For example, the protocols used by the network 810 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 9:
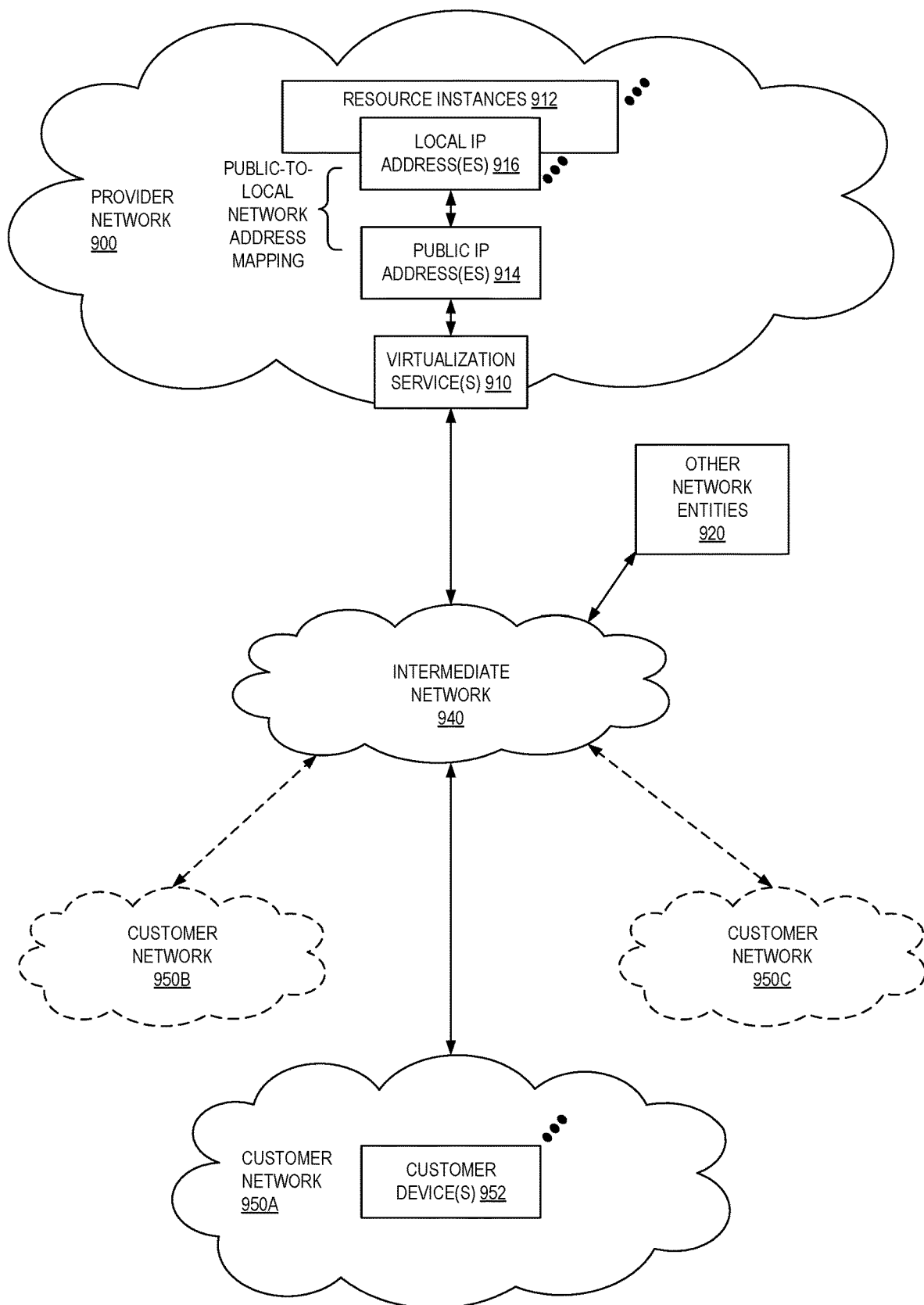
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local IP addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
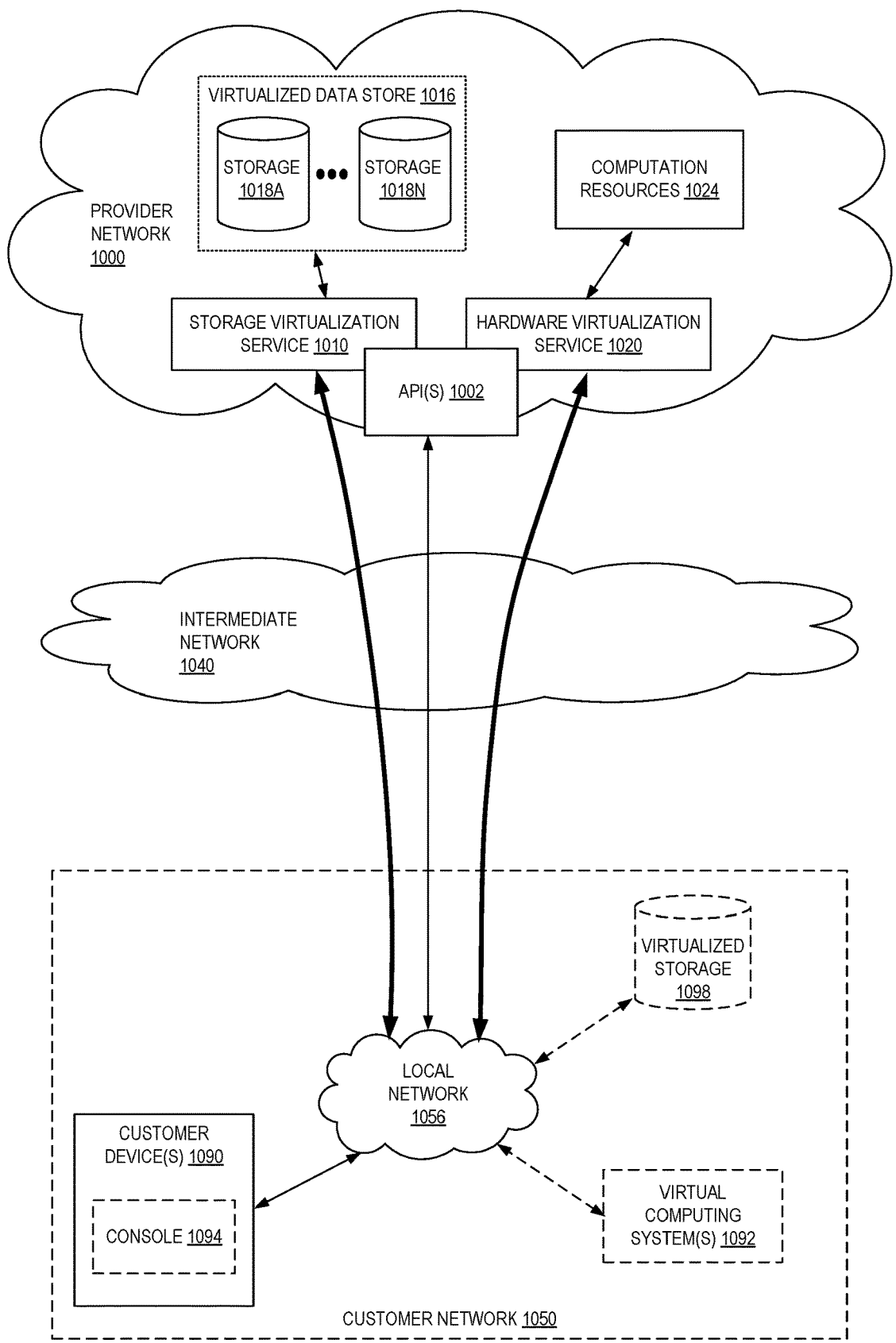
FIG. 10 is a block diagram of an example provider network that provides a storage virtualization service and a hardware virtualization service to customers according to some embodiments.

FIG. 10 is a block diagram of an example provider network that provides a storage virtualization service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage virtualization service 1010, for example via one or more APIs 1002, to access data from and store data to storage resources 1018A-1018N of a virtual data store 1016 provided by the provider network 1000. In some embodiments, a virtualized data store gateway (not shown) may be provided at the customer network 1050 that may locally cache at least some data, for example frequently accessed or critical data, and that may communicate with virtualized data store service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes, which appear to the user as local virtualized storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Figure 11:
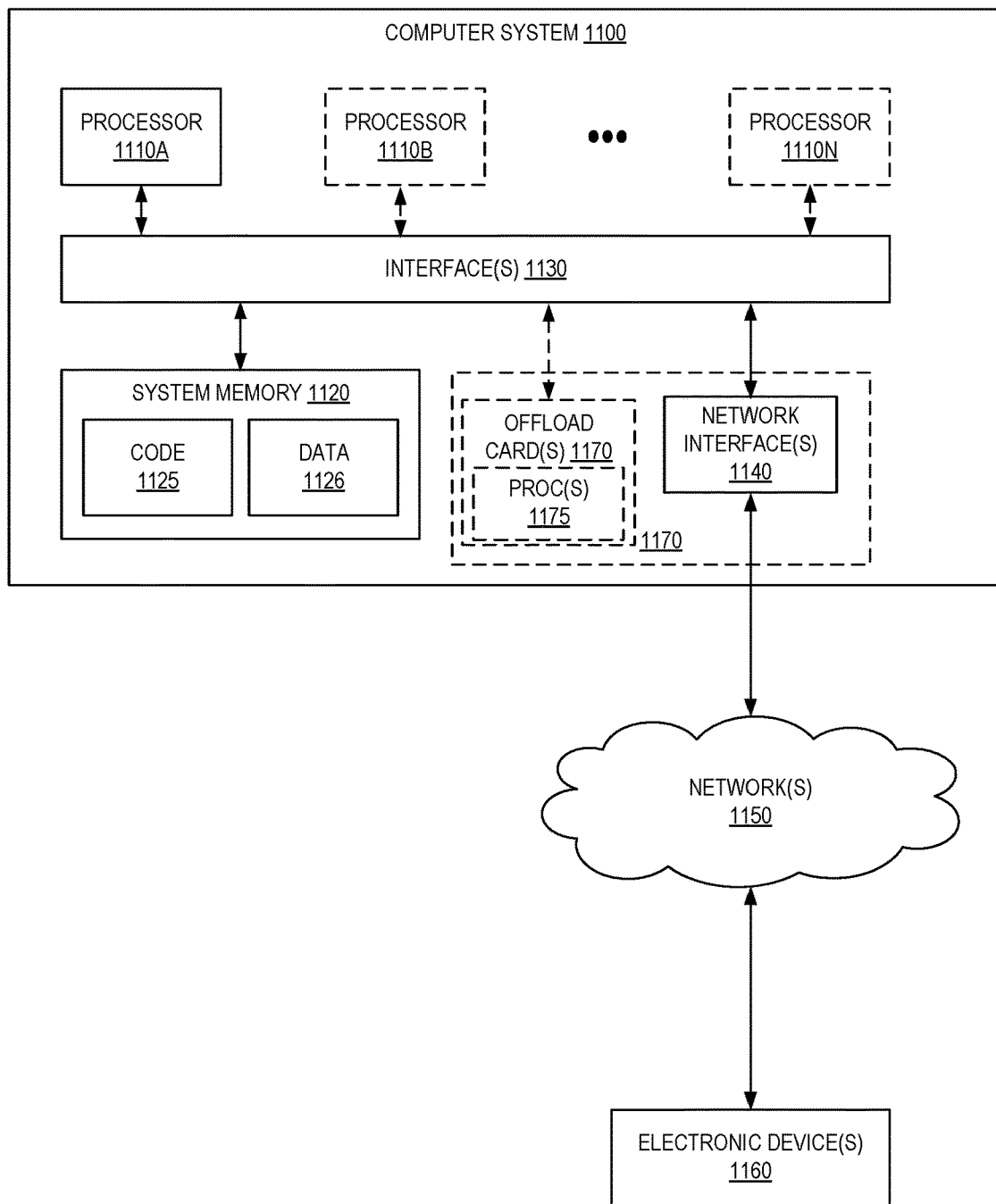
FIG. 11 is a block diagram illustrating an example computer system that may be used in some embodiments.

In some embodiments, a system that implements a portion or all of the techniques for dynamic accuracy-based deployment and monitoring of ML models as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 118A-118N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A method comprising:
receiving a request to deploy a plurality of machine learning (ML) models within a provider network in association with a Hypertext Transfer Protocol (HTTP) endpoint, wherein the plurality of ML models were trained to perform a common type of inference task;
configuring a model selector, within the provider network, to select between ones of the plurality of ML models according to a first distribution for inference requests received at the HTTP endpoint, the first distribution indicating that each ML model is to be selected according to a same likelihood;
obtaining a plurality of inference results generated by the plurality of ML models;
determining, based at least in part on the plurality of inference results, a plurality of accuracy scores corresponding to the plurality of ML models;
updating the model selector, based on the plurality of accuracy scores, to cause the model selector to select ones of the plurality of ML models to generate inferences for inference requests received at the HTTP endpoint according to an updated distribution that is different than the first distribution; and
providing, by the model selector, a plurality of inference requests received at the HTTP endpoint to the plurality of ML models according to the updated distribution.

2. The method of claim 1, wherein:
the updated distribution indicates that a first ML model of the plurality of ML models is to be selected to generate inferences at a higher likelihood compared to a corresponding likelihood of the first distribution; and
the updated distribution indicates that a second ML model of the plurality of ML models is to be selected to generate inferences at a lower likelihood compared to a corresponding likelihood of the first distribution.

3. The method of claim 1, wherein the plurality of inference results includes a first plurality of inference results generated by the plurality of ML models using a common input data.

4. The method of claim 3, wherein determining the plurality of accuracy scores is based at least in part on comparing the first plurality of inference results.

5. The method of claim 1, wherein determining the plurality of accuracy scores is based at least in part on comparing the plurality of inference results with a corresponding plurality of ground truth confirmations obtained using input data that was used by the plurality of ML models to generate the plurality of inference results.

6. The method of claim 1, wherein determining the plurality of accuracy scores is based at least in part on an analysis of explicit or implied user feedback provided by one or more users that caused inference requests to be issued that resulted in the plurality of inference results being generated by the plurality of ML models.

7. The method of claim 1, further comprising:
receiving a request to perform an inference using an input data;
selecting, by the model selector based on an analysis of the input data, a first ML model from a second plurality of ML models to be used to perform the inference; and
providing the input data to the first ML model.

8. The method of claim 7, wherein:
the selecting the first ML model comprises using the input data or other data generated based on the input data as input to a second ML model; and
the second ML model generates a result identifying the first ML model.

9. The method of claim 1, wherein the plurality of ML models are executed by a corresponding plurality of containers that are executed by one or more computing devices within the provider network.

10. The method of claim 1, further comprising:
providing, by the model selector, an inference request to each of the plurality of ML models; and
generating a result based on a plurality of inference results generated by the plurality of ML models.

11. The method of claim 1, further comprising:
receiving a message indicating that a second ML model is to be tested alongside a first ML model;
providing, by the model selector, an inference request to the first ML model and the second ML model;
sending a response to the inference request including a first inference result generated by the first ML model but not a second inference result generated by the second ML model; and
determining a first accuracy score for the first ML model based at least in part on the first inference result and a second accuracy score for the second ML model based on a second inference result generated by the second ML model.

12. The method of claim 1, further comprising determining an unbiased estimate of accuracy for each of the plurality of ML models that indicates how the corresponding ML model would have performed if it had processed the plurality of inference requests despite not having actually processed the plurality of inference requests.

13. The method of claim 1, wherein the request was originated on behalf of a user of the provider network and includes an identifier of the HTTP endpoint and identifiers of the plurality of ML models.

14. The method of claim 1, further comprising:
obtaining performance metrics associated with the plurality of ML models in generating the plurality of inference results, the performance metrics including at least one of a time to execute or a computing resource utilization amount,
wherein the causing of the model selector to be updated is further based at least in part on an analysis of the performance metrics.

15. The method of claim 1, further comprising:
determine that a first ML model, of the plurality of ML models, has an accuracy amount for a period of time that satisfies a threshold; and
causing the model selector to be updated to no longer pass any inference requests for inference requests received at the HTTP endpoint to the first ML model.

16. A system comprising:
a first one or more electronic devices to implement a dynamic router, the dynamic router including first instructions that upon execution cause the dynamic router to implement a model selector to select one or more of a plurality of machine learning (ML) models to perform inferences for inference requests, and cause the inference requests to be provided to the selected ML models; and
a second one or more electronic devices to implement a machine learning service, the machine learning service including second instructions that upon execution cause the machine learning service to:
receive a request to deploy the plurality of ML models in association with a Hypertext Transfer Protocol (HTTP) endpoint, wherein the plurality of ML models were trained to perform a common type of inference task;
configure a model selector, within a provider network, to select between ones of the plurality of ML models according to a first distribution for inference requests received at the HTTP endpoint, the first distribution indicating that each ML model is to be selected according to a same likelihood;
obtain a plurality of inference results generated by the plurality of ML models;
determine, based at least in part on the plurality of inference results, a plurality of accuracy scores corresponding to the plurality of ML models; and
cause the model selector to be updated, based on the plurality of accuracy scores, to use an updated distribution to select ones of the plurality of ML models to generate inferences for inference requests received at the HTTP endpoint, wherein the updated distribution is different than the first distribution.

17. The system of claim 16, wherein the plurality of inference results includes a first plurality of inference results generated by the plurality of ML models using a common input data.

18. The system of claim 17, wherein the second instructions upon execution further cause the machine learning service to determine the plurality of accuracy scores based at least in part on comparing the first plurality of inference results.

19. The system of claim 16, wherein the second instructions upon execution further cause the machine learning service to determine the plurality of accuracy scores based at least in part on a comparison of the plurality of inference results with a corresponding plurality of ground truth confirmations obtained using input data that was used by the plurality of ML models to generate the plurality of inference results.

20. The system of claim 16, wherein the second instructions upon execution further cause the machine learning service to determine the plurality of accuracy scores based at least in part on an analysis of explicit or implied user feedback provided by one or more users that caused inference requests to be issued that resulted in the plurality of inference results being generated by the plurality of ML models.

* * * * *